(12) United States Patent
Komsitsky et al.

(10) Patent No.: US 9,033,632 B2
(45) Date of Patent: May 19, 2015

(54) PANEL FASTENER, PANEL ASSEMBLY AND METHODS OF ASSEMBLY AND INSTALLATION

(75) Inventors: Igor Komsitsky, Los Angeles, CA (US); Javier Torres, Hacienda Heights, CA (US); Steve Misias, Sunland, CA (US); Florent Verdier, Rueil Malmaison (FR)

(73) Assignee: THE MONADNOCK COMPANY, City of Industry, CA (US)

( * ) Notice: Subject to any disclaimer, the term of this patent is extended or adjusted under 35 U.S.C. 154(b) by 409 days.

(21) Appl. No.: 13/394,814

(22) PCT Filed: Sep. 9, 2010

(86) PCT No.: PCT/US2010/048184
§ 371 (c)(1),
(2), (4) Date: Sep. 27, 2012

(87) PCT Pub. No.: WO2011/031806
PCT Pub. Date: Mar. 17, 2011

(65) Prior Publication Data
US 2013/0014376 A1   Jan. 17, 2013

Related U.S. Application Data

(60) Provisional application No. 61/241,022, filed on Sep. 9, 2009, provisional application No. 61/254,735, filed on Oct. 25, 2009, provisional application No. 61/286,776, filed on Dec. 15, 2009, provisional application No. 61/301,212, filed on Feb. 4, 2010.

(51) Int. Cl.
*F16B 37/04*   (2006.01)
*F16B 5/02*   (2006.01)
*F16B 37/08*   (2006.01)

(52) U.S. Cl.
CPC ......... *F16B 5/0208* (2013.01); *Y10T 29/49948* (2015.01); *F16B 37/043* (2013.01); *F16B 37/0864* (2013.01)

(58) Field of Classification Search
USPC ............... 411/44, 45, 85, 111–112, 172, 173, 411/174, 178, 180, 183, 187, 970, 182
See application file for complete search history.

(56) References Cited

U.S. PATENT DOCUMENTS

| | | | | |
|---|---|---|---|---|
| 4,875,815 A | * | 10/1989 | Phillips, II | 411/38 |
| 5,173,025 A | * | 12/1992 | Asami | 411/344 |
| 5,222,850 A | * | 6/1993 | Medal | 411/82.1 |
| 5,536,125 A | * | 7/1996 | Gaw, Jr. | 411/182 |

(Continued)

FOREIGN PATENT DOCUMENTS

| | | |
|---|---|---|
| DE | 197 07 731 | 8/1997 |
| FR | 2745343 | 2/1996 |

(Continued)

OTHER PUBLICATIONS

Heinzler, Marcus, International Search Report, PCT/US2010/048184, Nov. 24, 2010, 3 pages, WIPO.

*Primary Examiner* — Roberta Delisle
(74) *Attorney, Agent, or Firm* — Henricks, Slavin & Holmes LLP

(57) ABSTRACT

Panel fasteners, panel assemblies, methods of assembly and installation of panel assemblies and panel fasteners, anchor systems, anchor systems with captive fasteners and assemblies are disclosed.

16 Claims, 21 Drawing Sheets

(56) References Cited

U.S. PATENT DOCUMENTS

| | | | |
|---|---|---|---|
| 6,560,819 B2 * | 5/2003 | Mizuno et al. | 16/2.2 |
| 6,854,941 B2 | 2/2005 | Csik | |
| 7,374,200 B2 * | 5/2008 | Ikeda et al. | 280/728.2 |
| 7,621,707 B2 * | 11/2009 | Sbongk | 411/182 |
| 8,177,466 B2 | 5/2012 | Csik et al. | |
| 8,277,158 B2 | 10/2012 | Csik et al. | |
| 8,348,569 B2 * | 1/2013 | Tournier | 411/108 |
| 8,579,570 B2 * | 11/2013 | Fellows et al. | 411/112 |
| 8,636,454 B2 * | 1/2014 | Okada et al. | 411/45 |
| 2009/0103997 A1 | 4/2009 | Csik et al. | |

FOREIGN PATENT DOCUMENTS

| | | |
|---|---|---|
| GB | 2 434 424 | 7/2007 |
| WO | WO 87/01419 | 3/1987 |

* cited by examiner

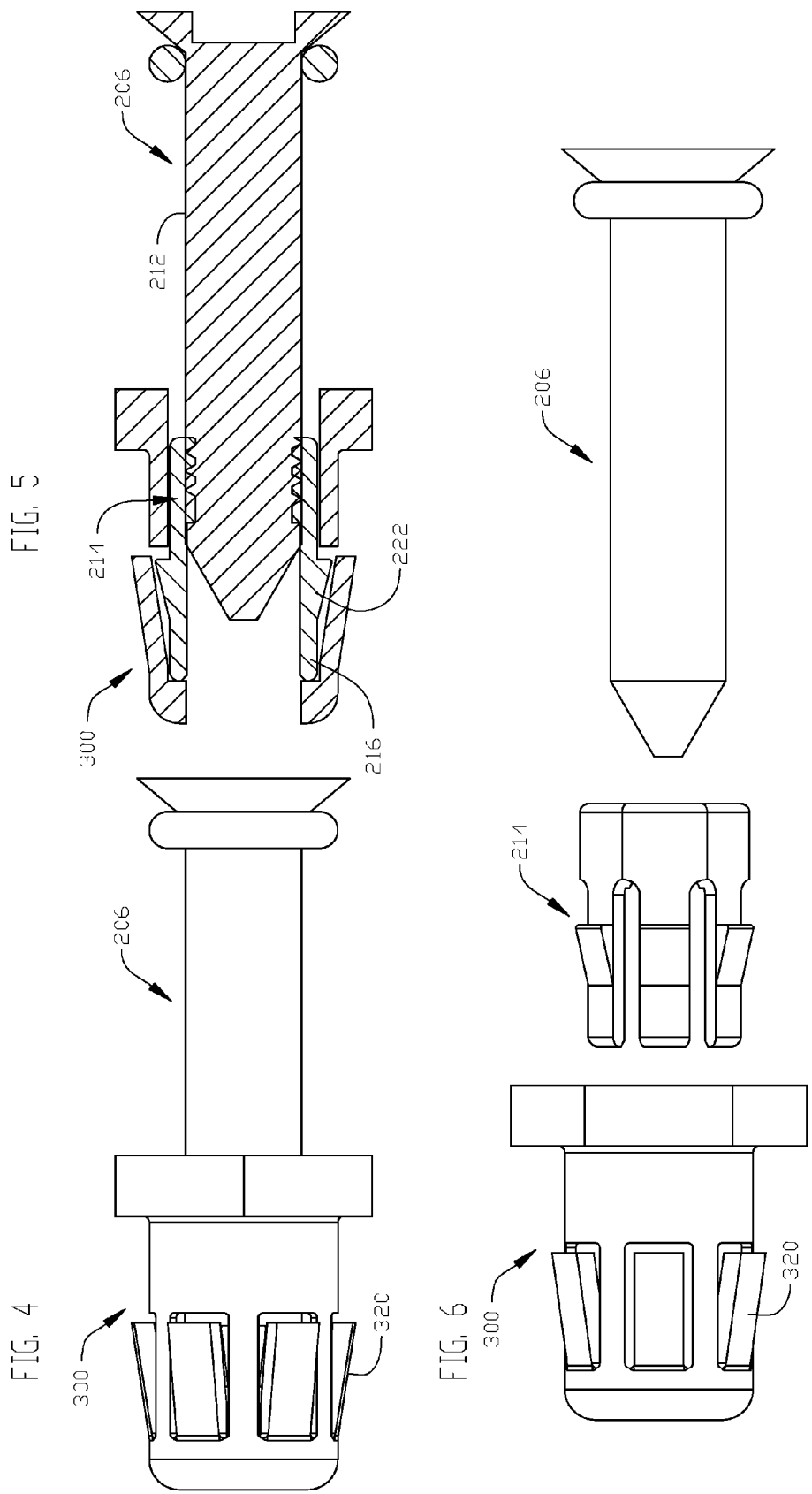

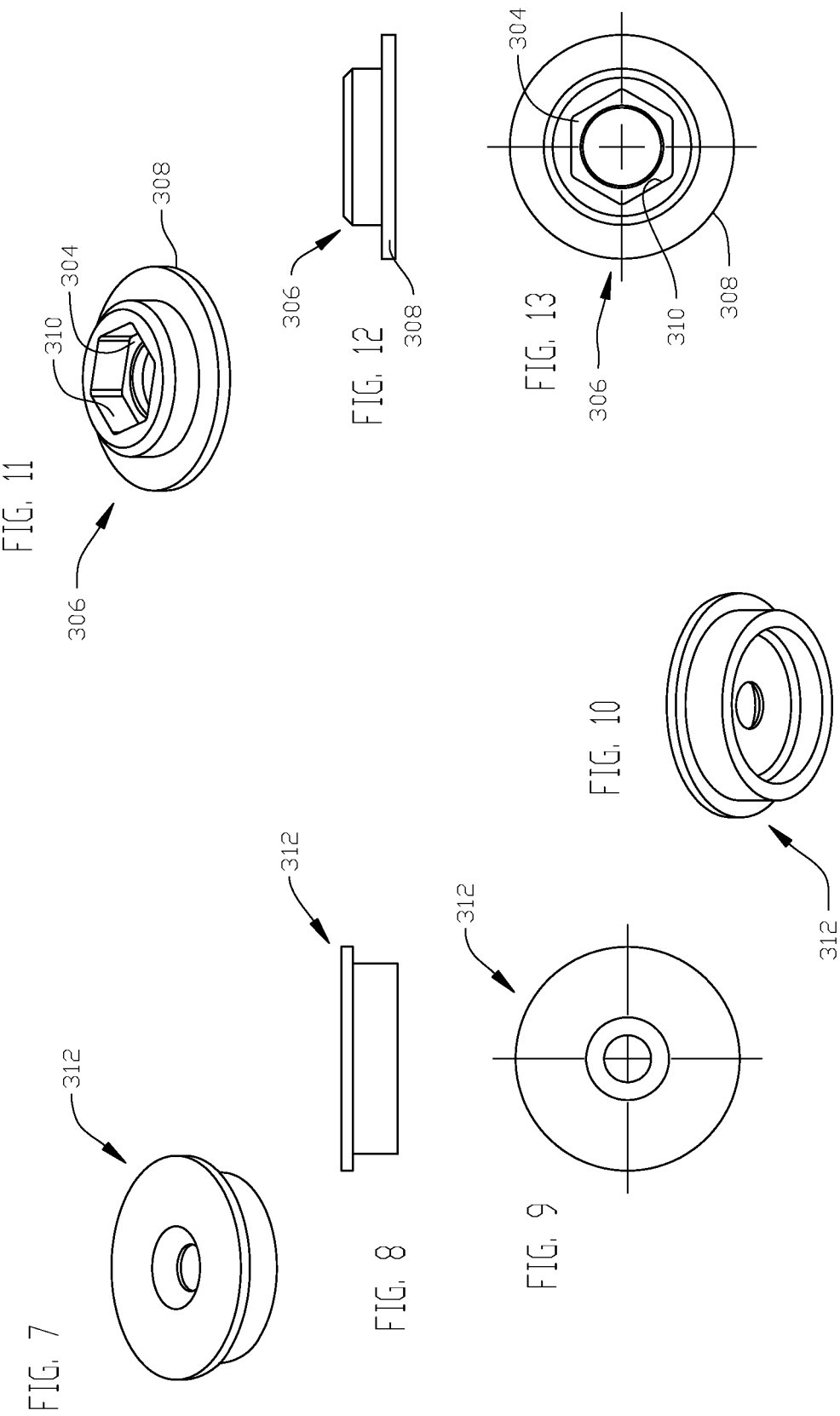

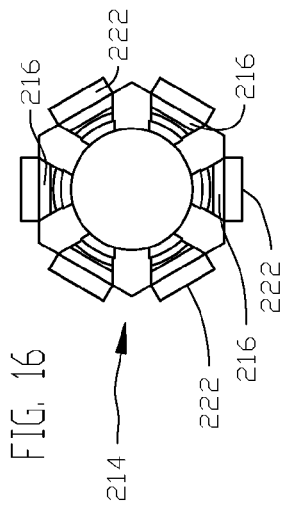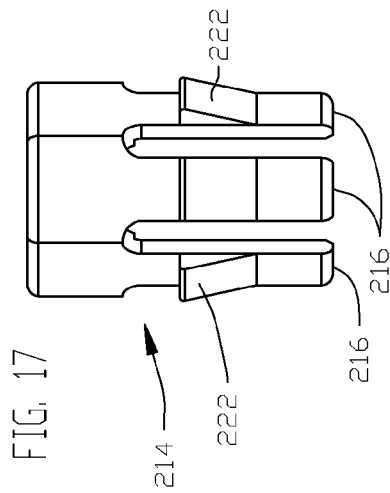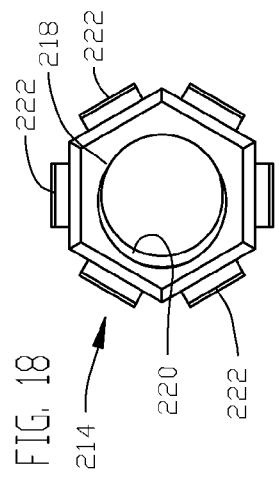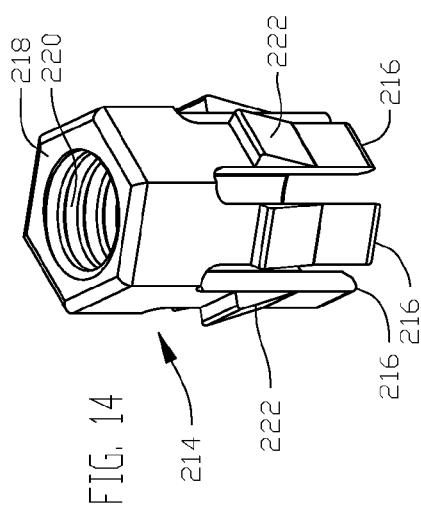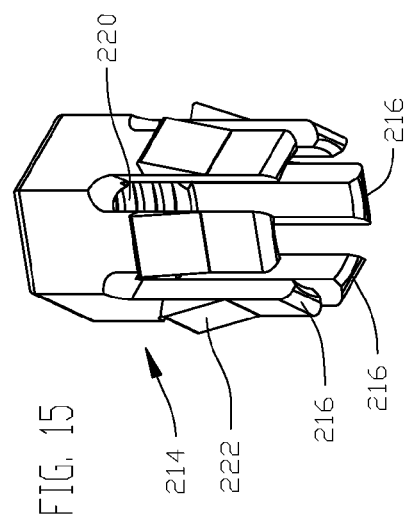

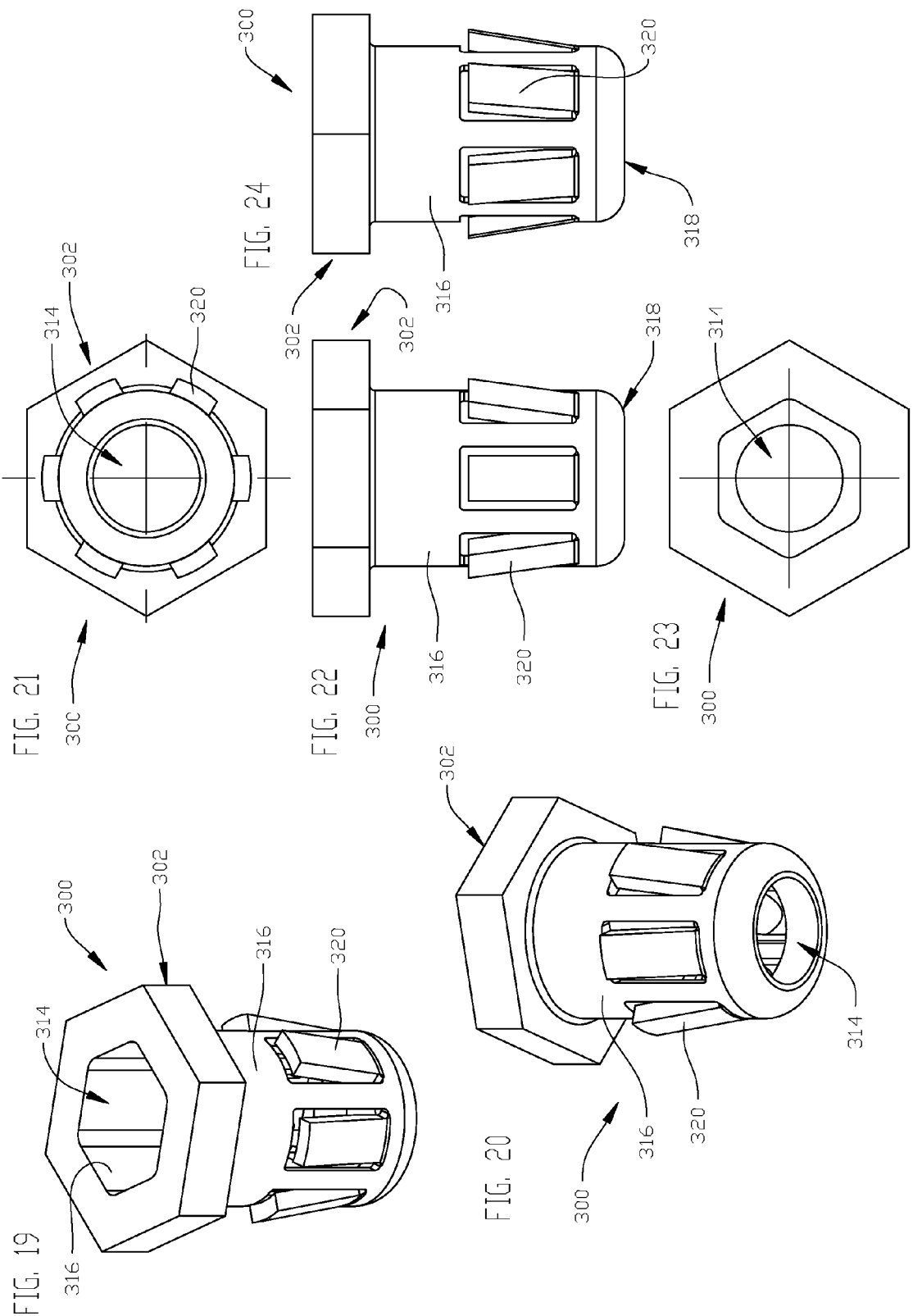

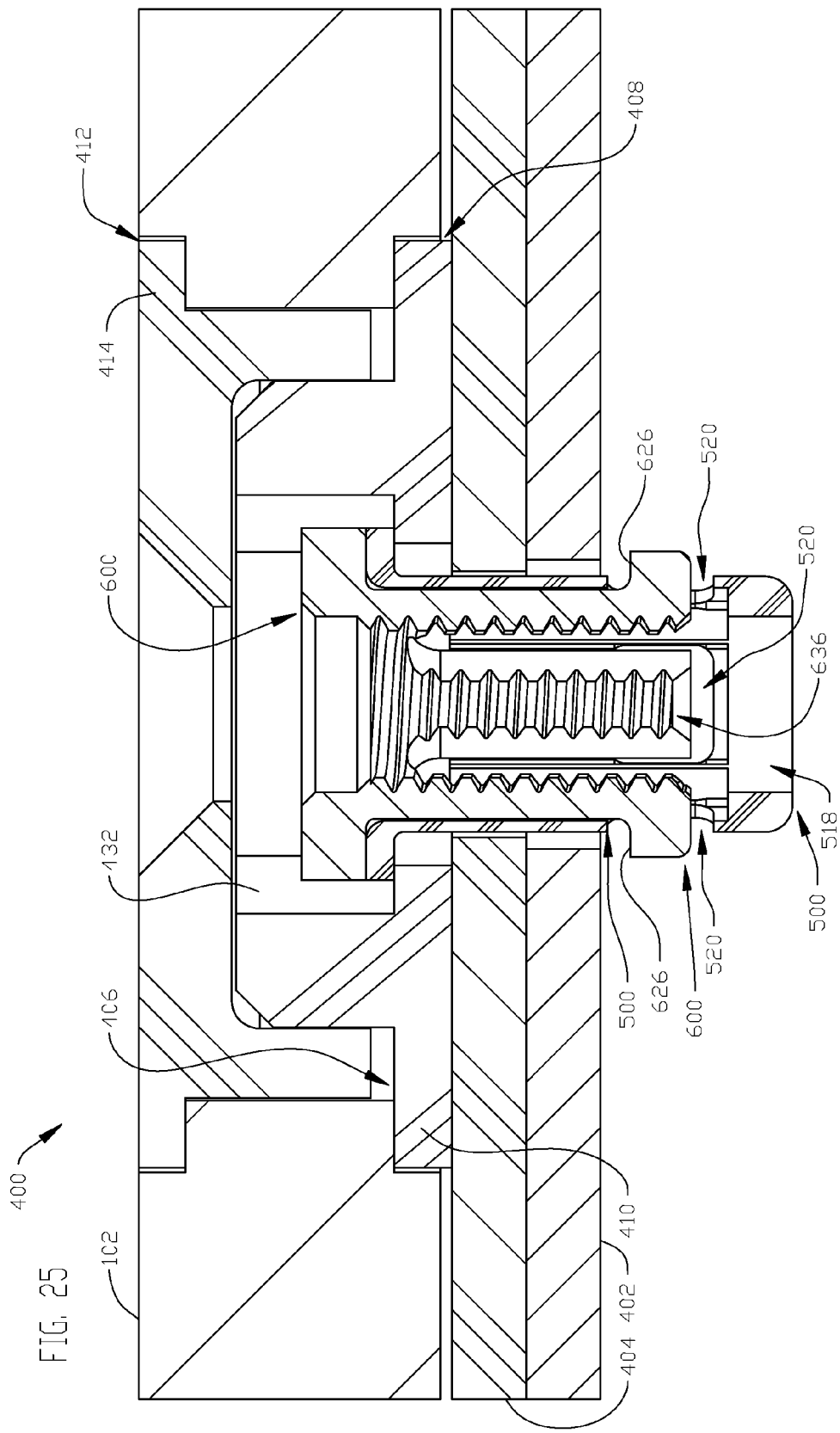

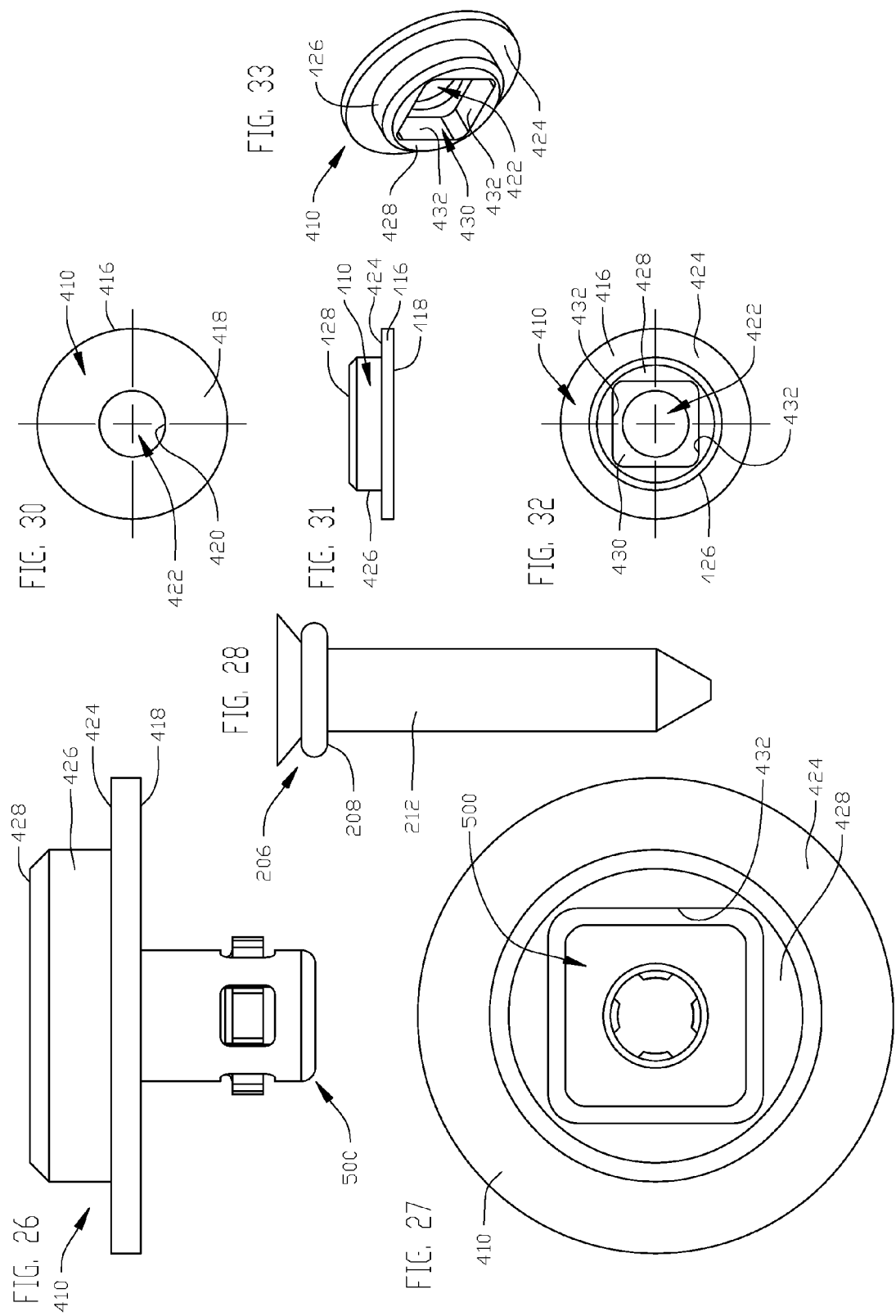

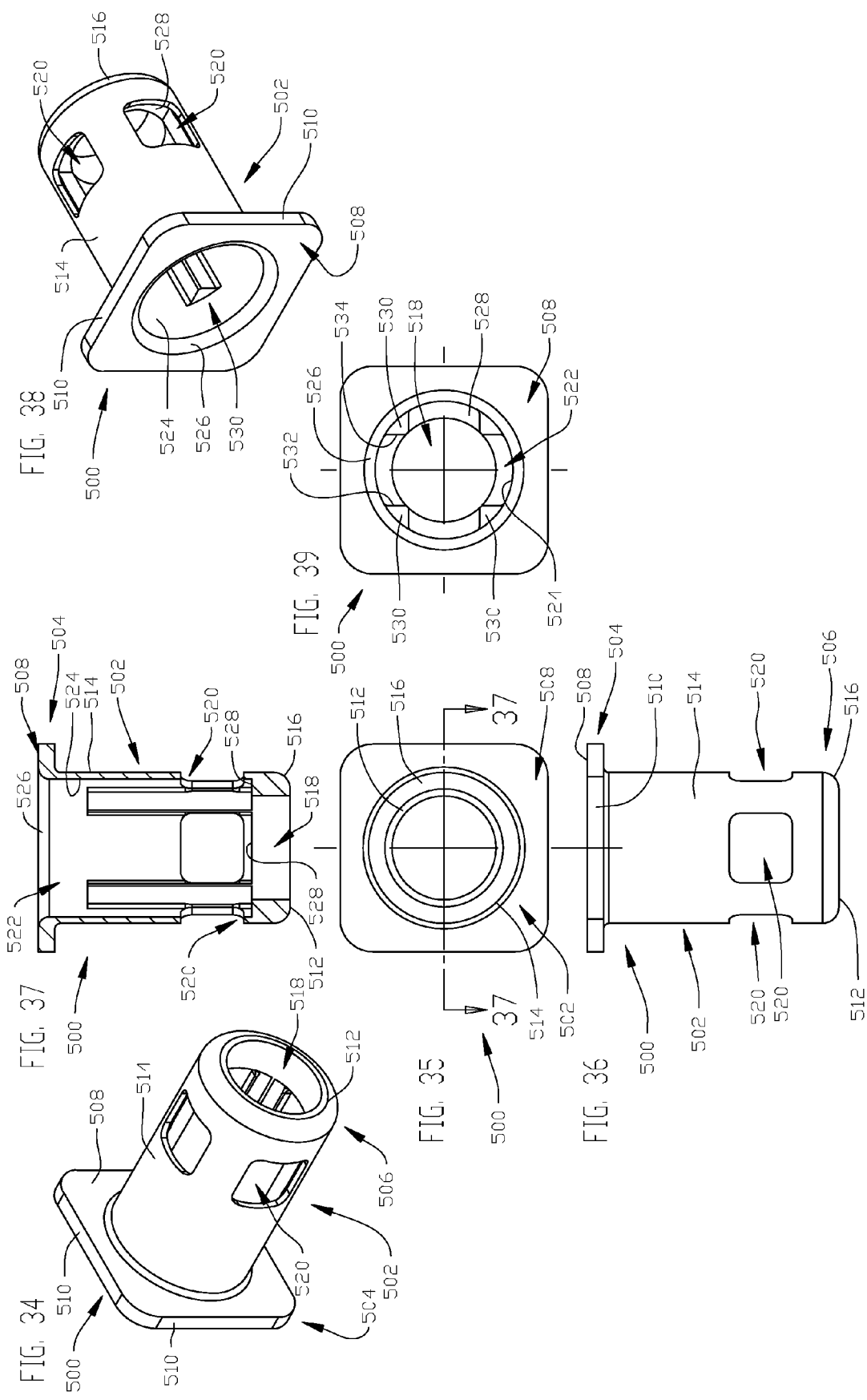

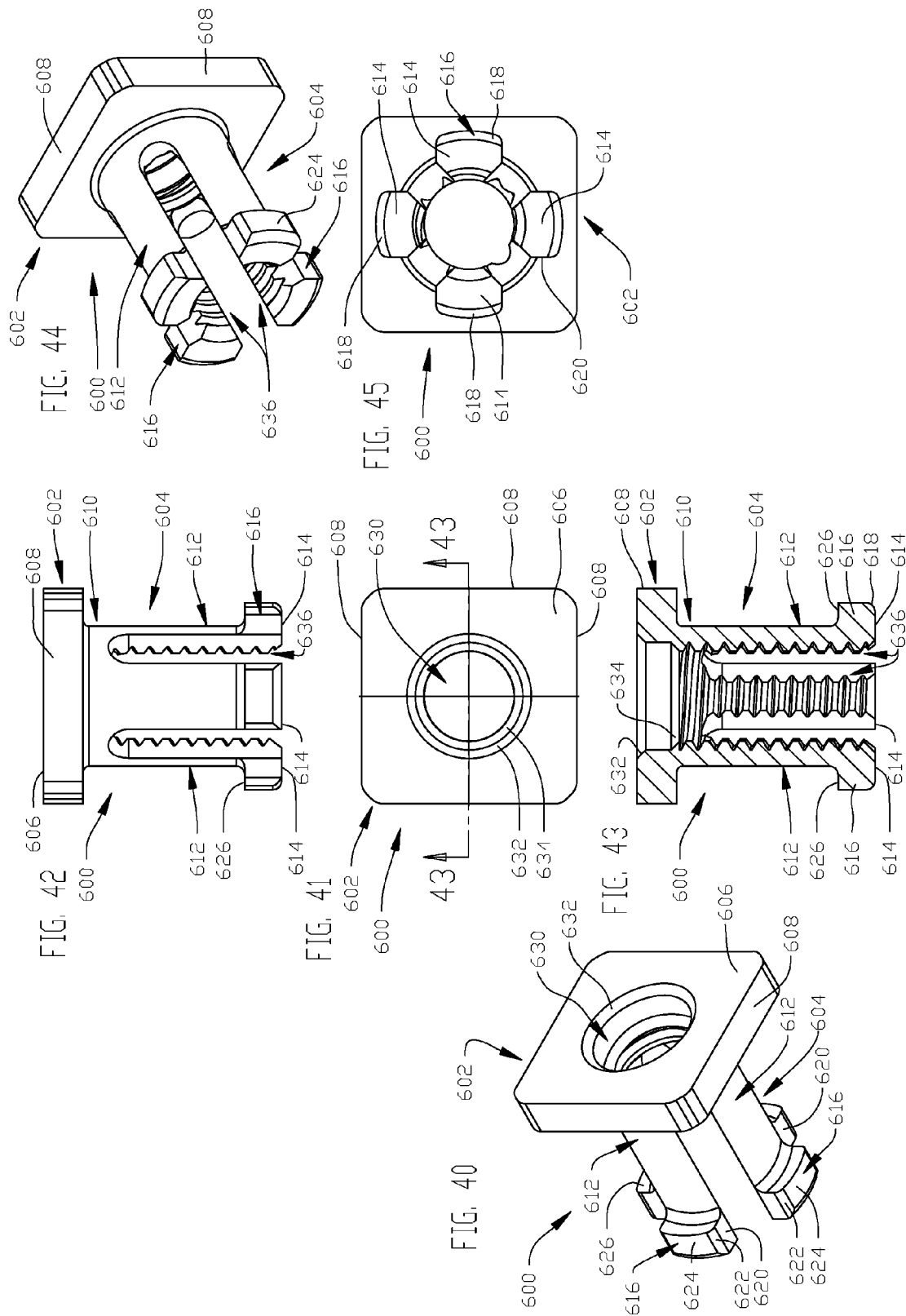

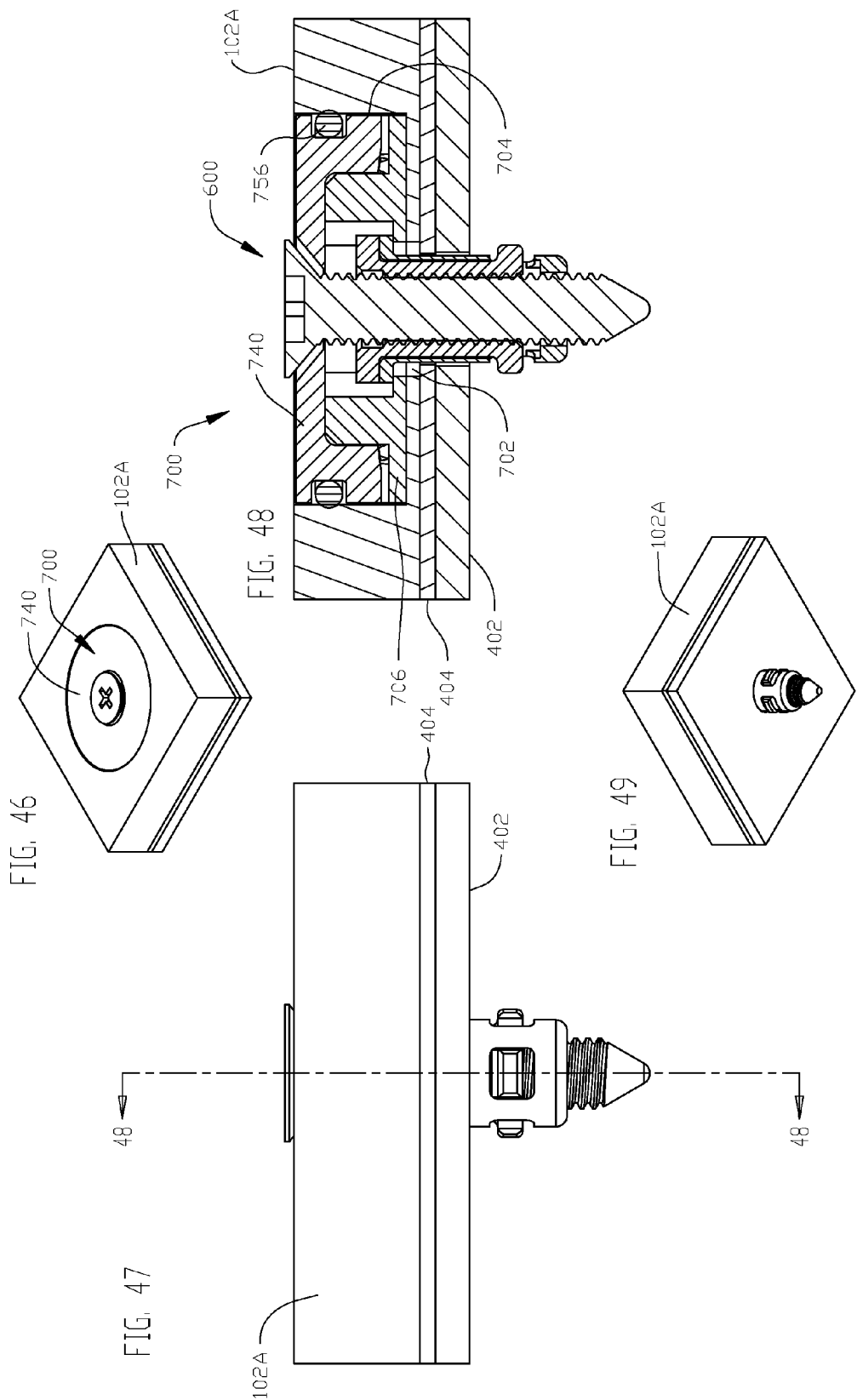

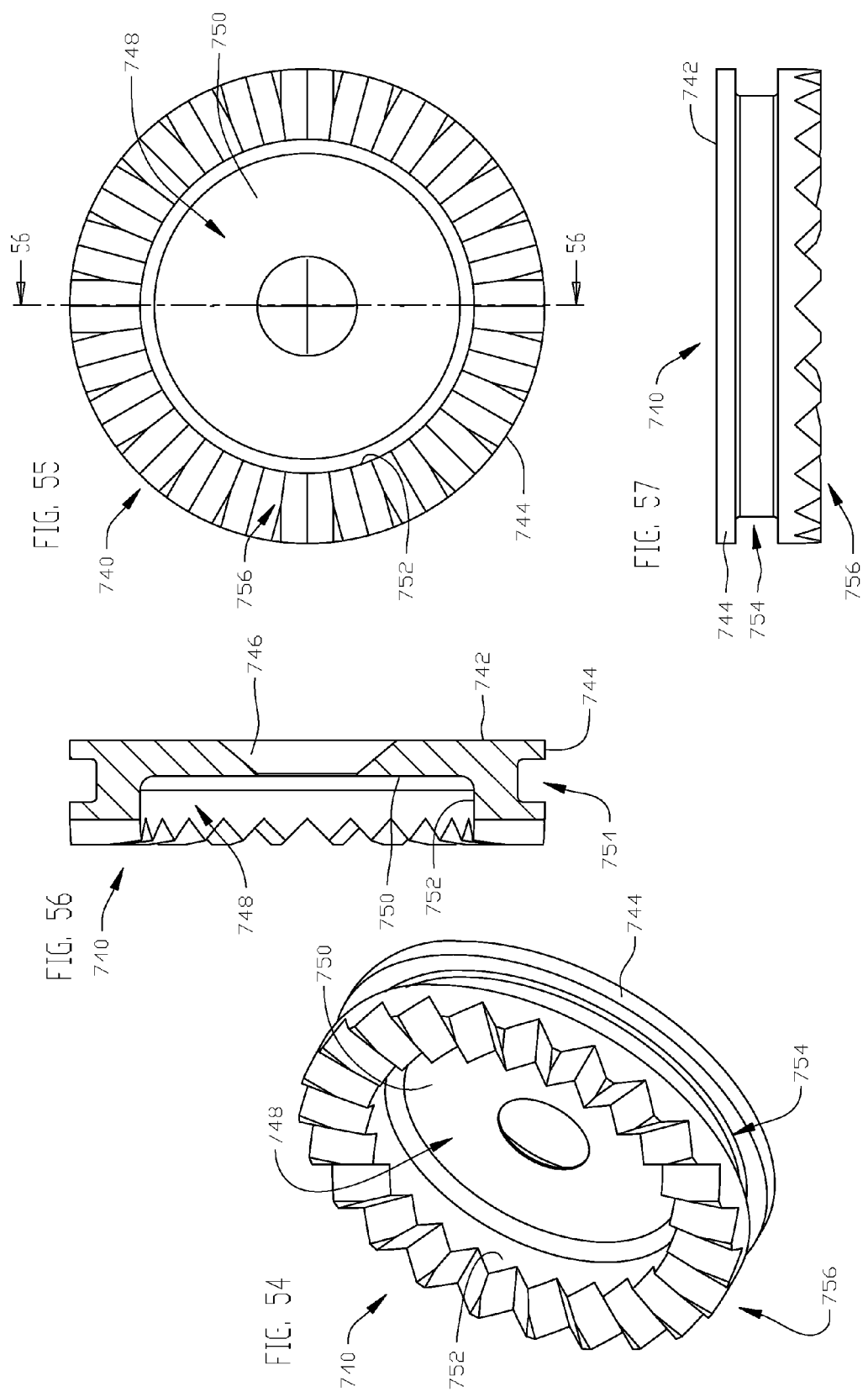

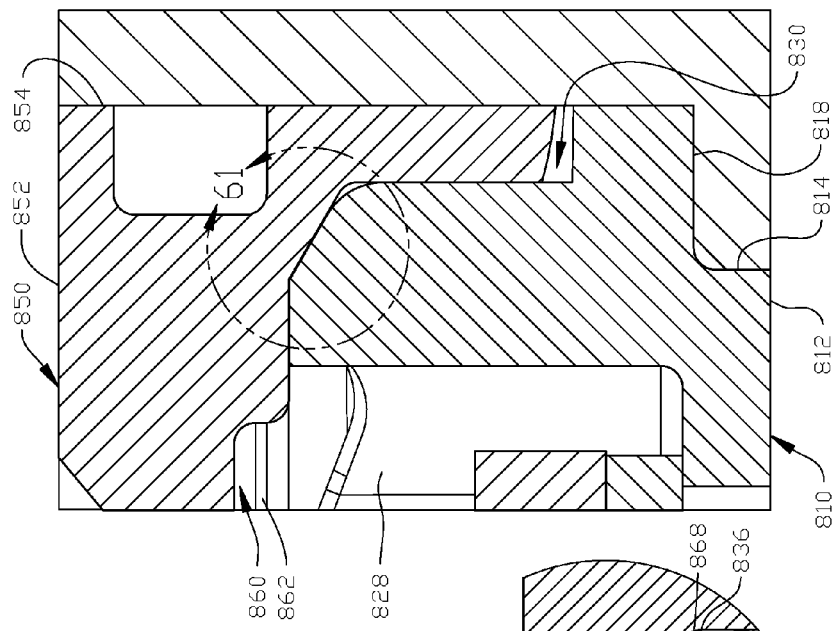
FIG. 60
FIG. 61
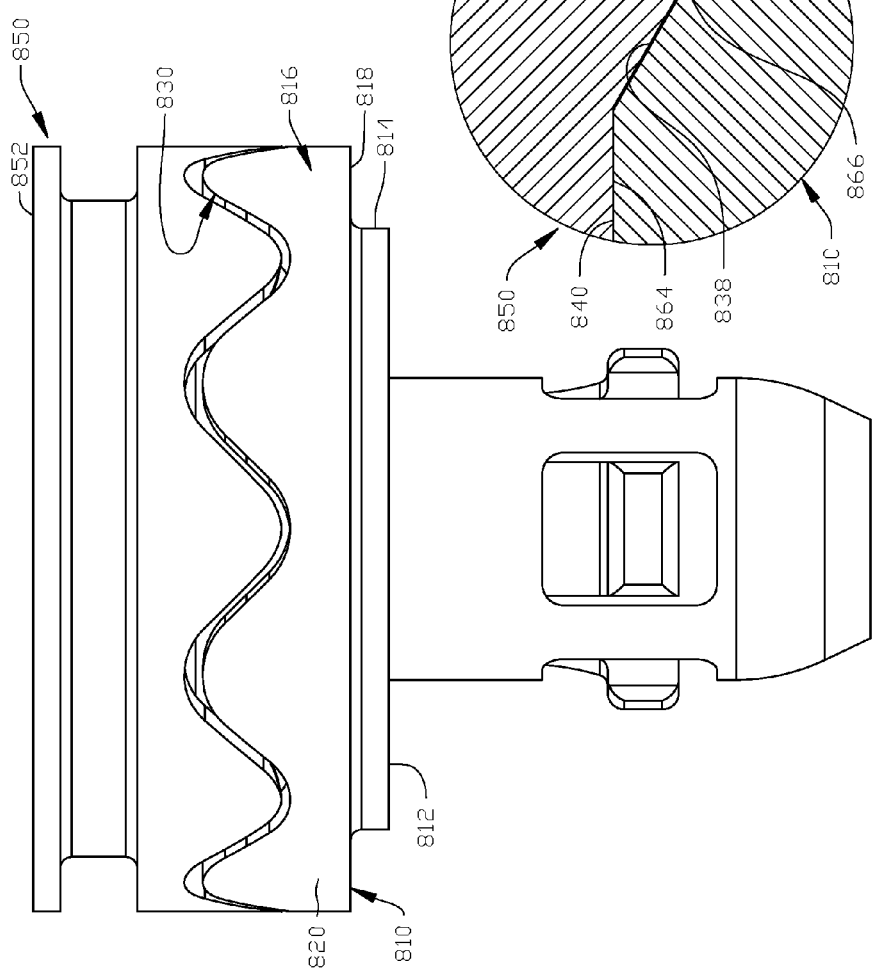
FIG. 59

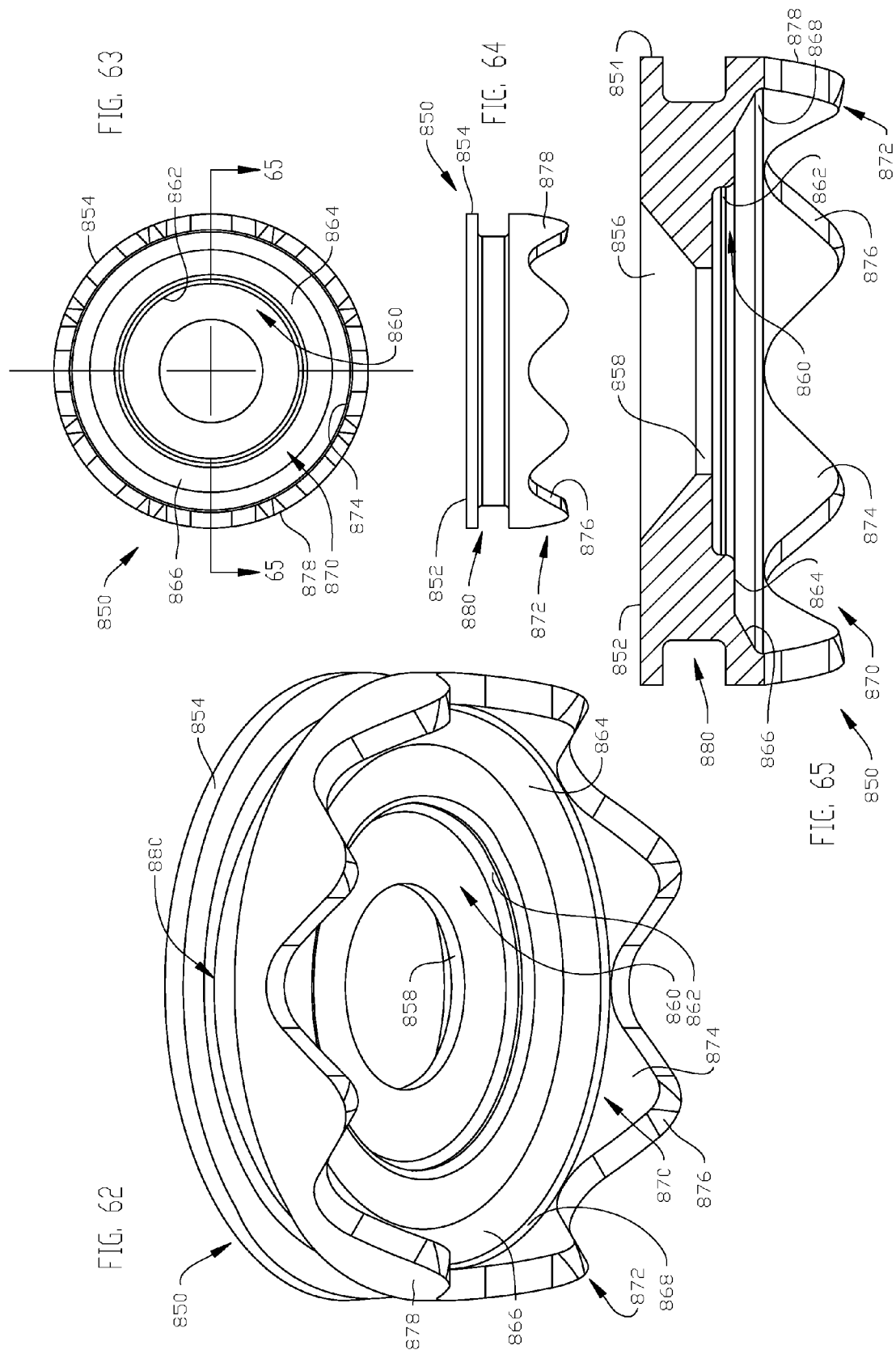

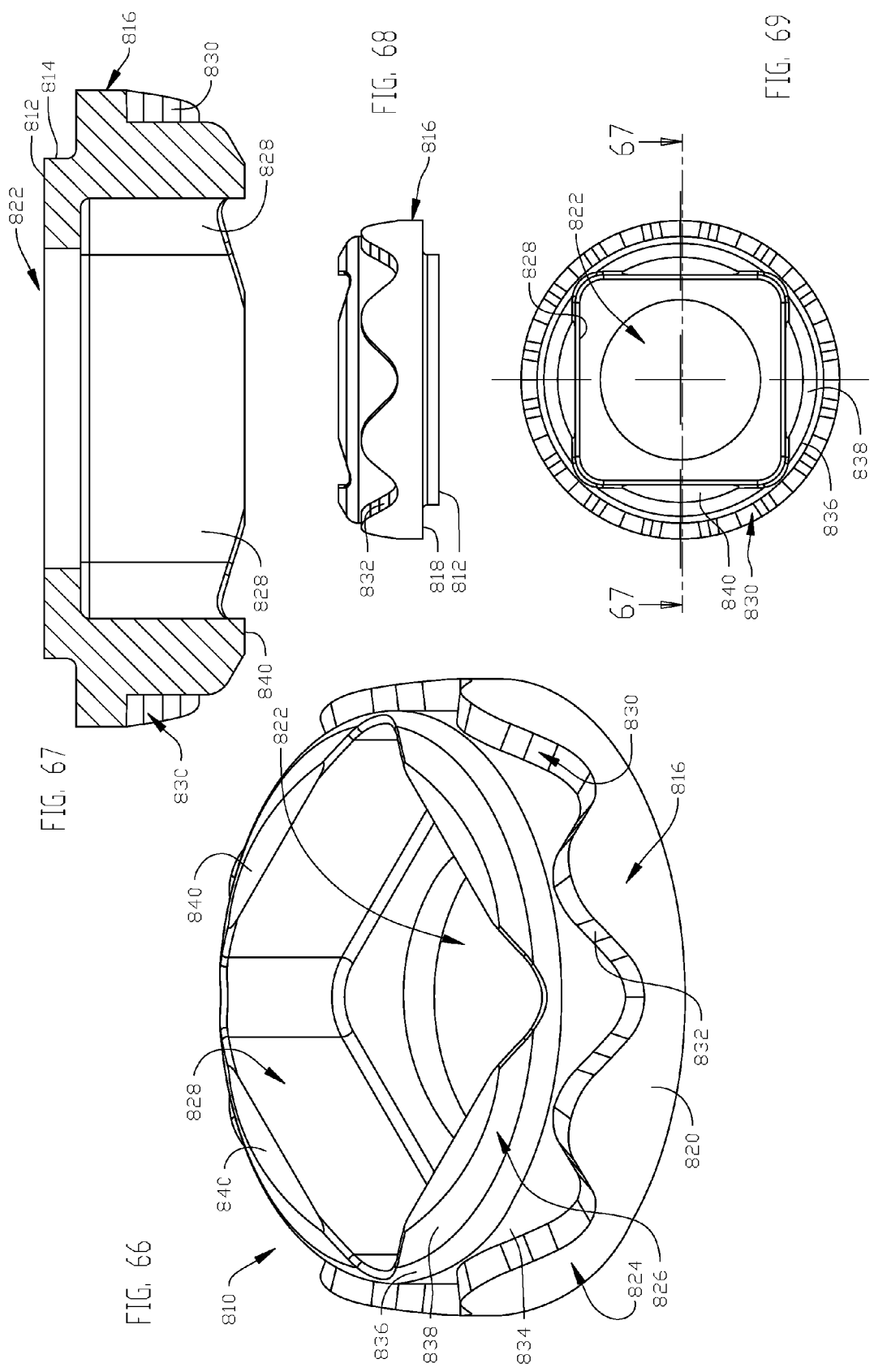

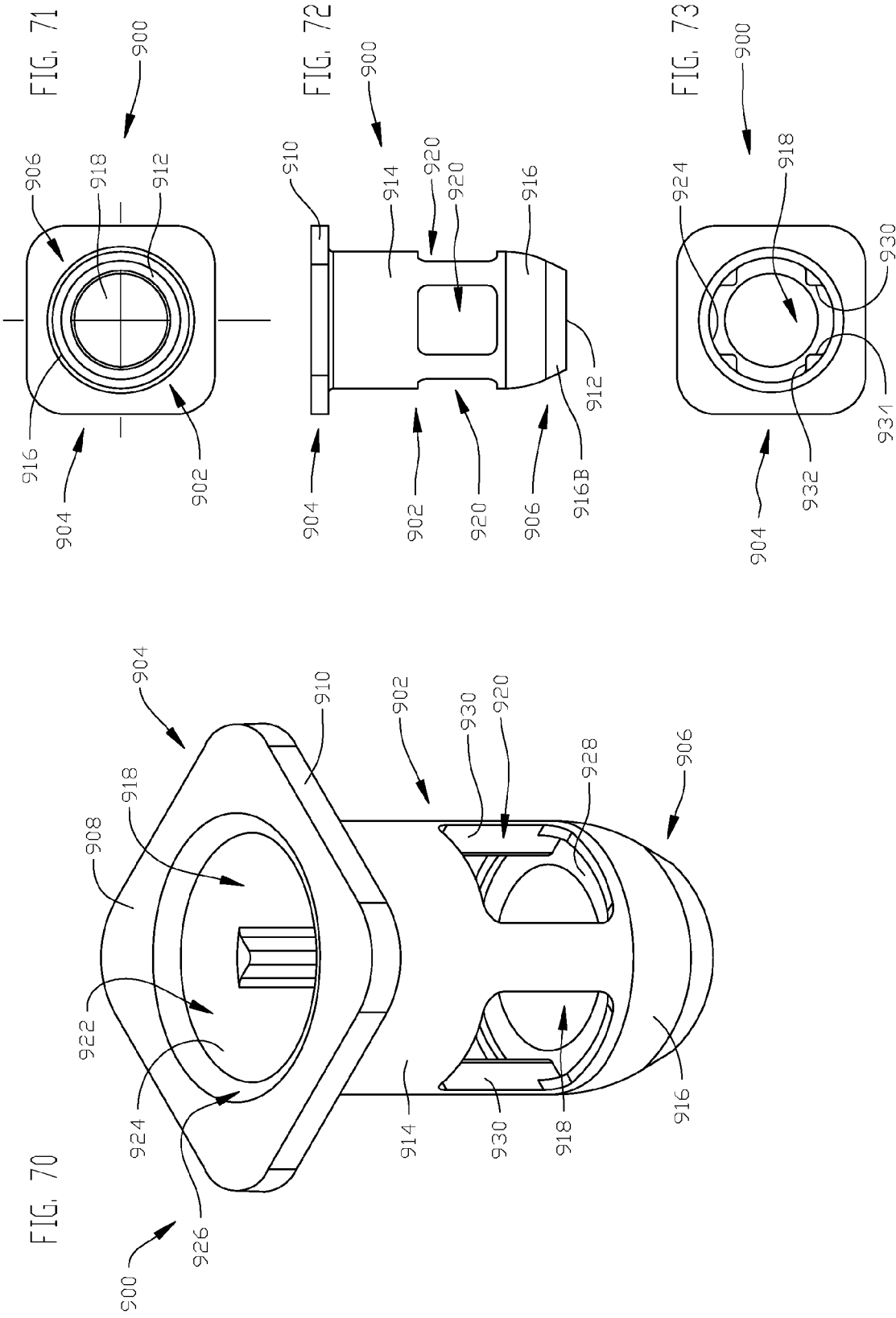

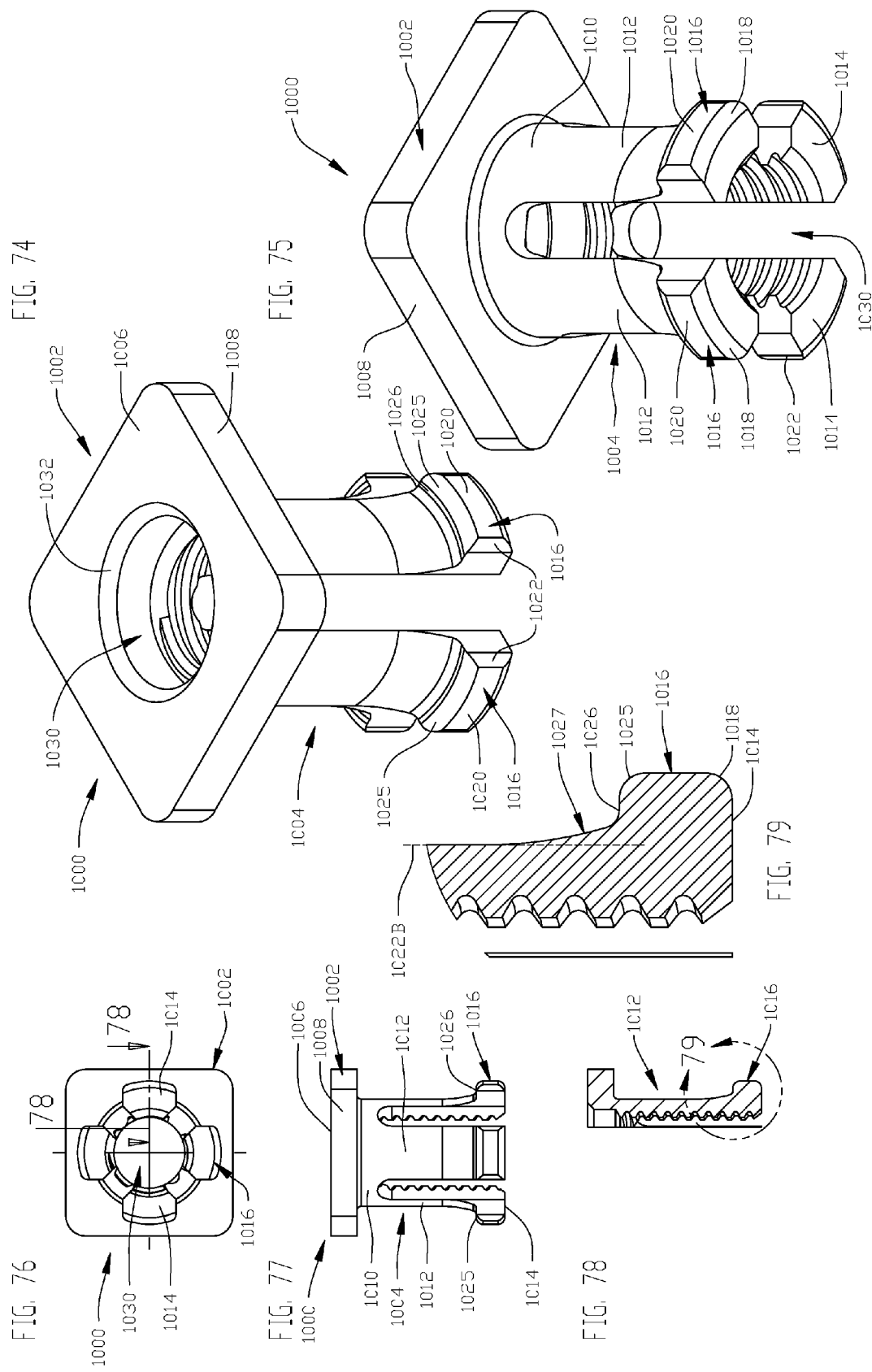

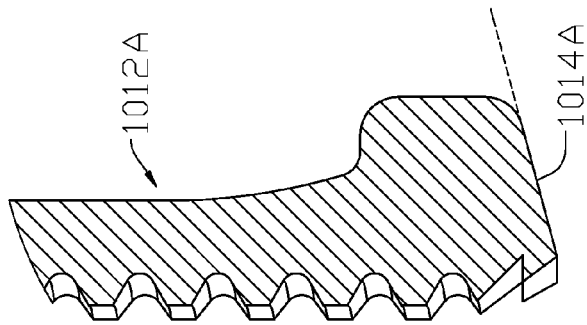
FIG. 81
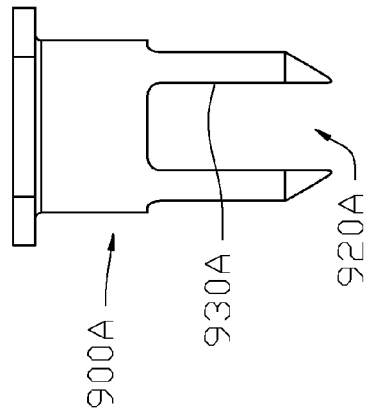
FIG. 84
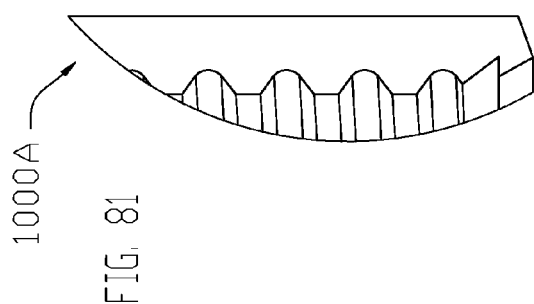
FIG. 83
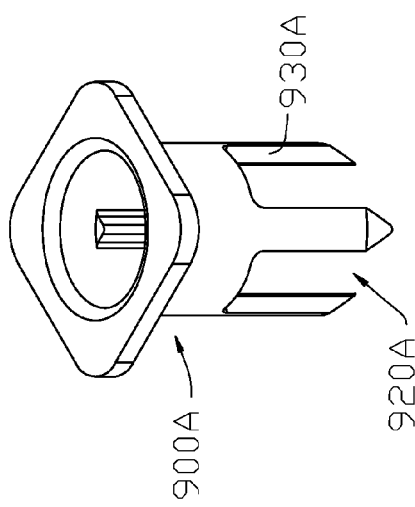
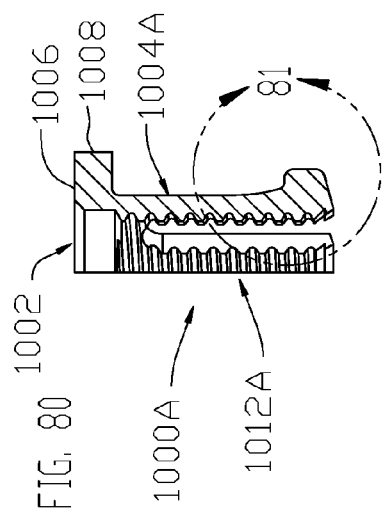
FIG. 80
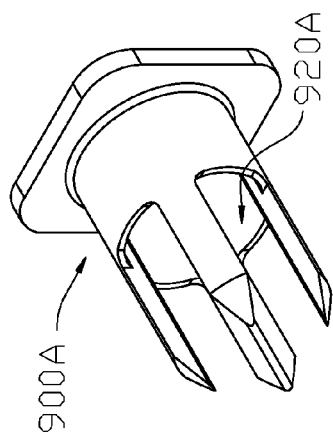
FIG. 82

PANEL FASTENER, PANEL ASSEMBLY AND METHODS OF ASSEMBLY AND INSTALLATION

CROSS REFERENCE TO RELATED APPLICATIONS

This application claims the benefit of provisional applications Ser. No. 61/241,022 filed Sep. 9, 2009, Ser. No. 61/254,735, filed Oct. 25, 2009, Ser. No. 61/286,776, filed Dec. 15, 2009, and Ser. No. 61/301,212, filed Feb. 4, 2010, incorporated herein by reference.

CROSS REFERENCE TO RELATED APPLICATIONS

This application is a National Stage of International Application No. PCT/US10/48184, filed Sep. 9, 2010.

BACKGROUND

1. Field

This relates to panel fasteners, panel assemblies, methods of assembly and installation of panel assemblies and panel fasteners, anchor systems, anchor systems with captive fasteners and assemblies.

2. Related Art

Floor panels may be attached or mounted to an underlying support structure so as to be removable using a nut and bolt combination. The threaded bolt or stud may be passed through a front side of a passageway between a floor panel and the underlying structure to be engaged with a threaded nut on a backside of the structure, and the fasteners tightened to secure the floor panel. Nut plates and floating nut plates may be used to secure panels, such as is disclosed in US patent publication numbers 2008/0310931, 2009/0103997, and 2009/0129885, each of which is incorporated herein by reference. Clip nuts may also be used to secure panels, such as that shown in U.S. Pat. No. 6,854,941, incorporated herein by reference.

SUMMARY

Fastener assemblies are disclosed that may be used to help protect adjacent structures during use of the fastener assembly, for example during an installation procedure. A panel assembly is disclosed having one or more fastener assemblies already incorporated into the panel, for example so the panel assembly is ready to be installed, for example by aligning the fastener assemblies with corresponding openings in an underlying support structure and securing the fasteners. One or more or each of the fastener assemblies may include protective elements on exposed surfaces thereof to help in protecting adjacent structures from marring or scratching while maneuvering or installing the panel assembly. Methods are disclosed that may simplify installation of panel sub-assemblies into final assemblies, for example on aircraft.

In an example of a panel fastener, for example a fastener assembly that can be a captive fastener assembly, an anchor system, or a panel anchor system, a threaded portion extends longitudinally into a longitudinally extending portion, which may for example be a sleeve, but does not extend distally beyond a distal-most portion of the longitudinally extending portion. In many applications, the threaded portion will be a female threaded portion, and in some applications a female threaded collet or slotted sleeve. In many applications, the longitudinally extending portion is an at least partially cylindrical portion with a bore for receiving the threaded portion. The distal-most end portion of the longitudinally extending portion may be rounded, and may be formed from a material softer than that of components it may contact, such as underlying support structures. In some applications, the longitudinally extending portion can protect surrounding structures from damage due to either the female threaded portion or a complementary fastener threaded into the female threaded portion. In one example of a fastener assembly, a female-threaded slotted sleeve extends into an outer sleeve portion but under normal expected applications does not extend beyond a distal-most end of the sleeve portion. In one configuration, the sleeve portion includes side openings allowing projections on the slotted sleeve to extend outside of the sleeve portion, for example to engage the underside of an adjacent structure. Additionally, where a complementary fastener element is threaded into the female-threaded slotted sleeve, the fastener element does not extend beyond a distal-most end of the outer sleeve portion under normal expected applications. The outer sleeve portion may be formed from a plastic.

In another example of a fastener assembly, for example an assembly that can be a captive fastener assembly, an anchor system or a panel anchor system, a female-threaded receptacle includes longitudinally-extending legs supported by a ring element. One or more of the legs exclusively may include threads for engaging a complementary fastener element, the ring element exclusively may include threads, or both may include threads. Where the legs include threads, the threads may but need not extend the entire longitudinal length of the legs, and where the ring element includes threads, the threads may but need not extend the entire longitudinal length of the ring element. Threads on the legs help to improve the lifespan of the threaded receptacle. The number of legs can be selected according to the available spacing, expected loading as well as other criteria. The female threaded receptacle extends into but not beyond a distal-most surface of a cylindrical element, in one example an outer sleeve. The cylindrical element may but need not be threaded, and may but need not have an inwardly-extending distal rim portion. The female threaded receptacle and the cylindrical element may be assembled for use with a fastener element threaded into the receptacle. Additionally, the female threaded receptacle and the cylindrical element may be assembled for use in a panel opening, and in many applications the panel will have fixed in the opening an opening liner or finish element with a noncircular surface that helps to keep one or both of the female threaded receptacle and the cylindrical element from pivoting within the opening.

In an example of a panel assembly, a panel or other extended structure includes a non-circular opening portion for receiving a fastener assembly. The fastener assembly includes a non-circular surface portion so that the non-circular opening portion can help to limit pivoting of the fastener assembly in the opening. The fastener assembly includes a cylindrical element extending longitudinally to a distal-most end portion, and a female threaded portion extending into the cylindrical element but not beyond the distal-most end portion. The cylindrical element includes side openings to allow the female threaded portion to extend partly through the openings to engage the underlying surface of an adjacent structure. In some applications, the cylindrical element may be a plastic sleeve and the threaded portion may be a slotted sleeve, and one or both of the sleeve and the slotted sleeve may have flats for engaging surfaces in the non-circular opening portion. The slotted sleeve may also assist in easing the release of the assembly from the support structure, for example for maintenance, inspection or for other reasons.

In one example of a method of assembling a fastener assembly, a female threaded portion is inserted longitudinally into a cylindrical element but not past a distal end portion of the cylindrical element. A complementary fastener element is threaded into the female threaded portion. Additionally, the complementary fastener element may be threaded far enough into the threaded portion so that one or more portions of the female threaded portion extends laterally outward of the cylindrical element. In one example, the complementary fastener element is threaded no farther than the distal end portion of the cylindrical element. In some applications, the female threaded portion is a slotted sleeve and the cylindrical element is an outer sleeve, which may be formed from a plastic material.

In another example of a method of assembling a fastener assembly, a female threaded slotted sleeve is inserted longitudinally into an outer sleeve portion but no further than a distal-most end of the sleeve portion. Legs on the slotted sleeve engage the sleeve in such a way that inhibits relative pivoting between the slotted sleeve and the sleeve. A complementary fastener may also be threaded into the slotted sleeve, and threaded to such an extent that portions on the slotted sleeve legs bear against the underside of an adjacent structure.

In an example of assembling a panel or other extended structure, at least one fastener assembly is assembled into an opening in the structure. In one example, the fastener assembly includes a female threaded portion, in one example a collet or slotted sleeve, and a cylindrical element, in one example an outer sleeve, in such a way that the female threaded portion does not extend past a distal-most portion of the cylindrical element. In other examples, the fastener assembly can be any existing floor panel fasteners, or any existing structural panel fasteners, by way of example. In one example, the structure opening has a noncircular surface, and in another example, the structure opening includes a non-circular finish structure. In a further example, a complementary fastener element is threaded into the female threaded portion. In another example, the panel is assembled with a plurality of fastener assemblies, which may also include the complementary fastener elements threaded into respective assemblies, before the panel is placed adjacent and secured to a support structure using such complementary fastener elements. Such panel assembly having a plurality of fastener assemblies already installed may be considered a pre-assembled panel assembly. In another example, a pre-assembled panel assembly may be shipped to a final assembly location where it is placed against and secured to its intended support structure. In a further example, a pre-assembled panel assembly, or a plurality of pre-assembled panel assemblies, are installed and secured in containers for shipping and shipped to a final assembly location, for example where an aircraft is being assembled. Each pre-assembled panel assembly is then freed from its respective container, for example by removing or opening the container, matched up with its intended location in the final assembly and secured thereto.

In an example of assembling a panel or other extended structure for installation on an aircraft, a structure is selected having a shape and configuration for installation on a selected portion of the aircraft. The structure has or is formed to have a plurality of openings having opening finishes, at least some of which include non-circular surfaces for engaging one or more non-circular surfaces on respective fastener assemblies. A plurality of fastener assemblies are assembled into respective finished openings in the structure. In one example, the fastener assembly includes a female-threaded slotted sleeve inserted into an outer sleeve in such a way that the slotted sleeve does not extend beyond a distal-most surface on the outer sleeve. In a further example, a complementary-threaded fastener is threaded into the slotted sleeve and surfaces on the slotted sleeve extend laterally outside of the outer sleeve and engage an underlying surface on the structure. The pre-assembled structure is then moved to the location on the aircraft where it will be installed, and secured thereto. In one example, the pre-assembled structure is packaged or otherwise secured in a containment for protection prior to being moved to the location of the aircraft.

In an example of installing a panel or other extended structure on an aircraft, a pre-assembled structure is positioned adjacent the location where it will be installed on the aircraft. The structure includes a fastener assembly having at least one protective element on a distal side of the structure that will come into contact with the aircraft. In one example, the structure includes a fastener threaded into a female-threaded receptacle at the time that the structure is placed on the aircraft, and the fastener does not extend distally beyond the at least one protective element. The structure is thereafter secured to the aircraft, including by threading the fastener into a support structure on the aircraft. In one example, the fastener is threaded into an opening in the aircraft support structure, and in a further example, the opening includes a second structure or element added to the opening and in a further example, the opening does not have any second structure between the female-threaded receptacle and the aircraft support structure. In this further example, the panel assembly is easily added to the aircraft support structure without having to add elements, such as other fastening elements or threaded elements, to or adjacent the opening in the aircraft support structure, for example where the fastener assembly is one such as those referenced herein, including any of those illustrated and described in conjunction with the drawings herein.

A fastener assembly is described that can be assembled into a panel or other structure to be secured and may include an axially movable element such as a ring element having cantilevered or axially extending bars or rods extending axially from the ring element. The ring element is internally threaded to engage an externally threaded bolt, stud or other fastener element. The axially extending bars each, in the present example, include one or more outwardly extending tabs, cam surfaces, latches, or other outwardly extending projections for engaging corresponding respective surfaces on a body on the outside of the axially movable element. In one example, the ring element includes external flats or other non-circular surfaces for engaging corresponding surfaces on the outside body (outside of the ring element). In another example, the axially extending bars are the only components on the ring element that rotationally engage the outside body.

The outside body includes a bore into which the ring element and its axially extending bars may be inserted, to form a fastener assembly. The outside body may be used to engage an underlying structure to which a panel or other structure is to be mounted. The outside body includes one or more cantilever structures or bars, which may correspond to respective bars on the ring element, formed on a distal portion of the outside body. The cantilever structures, for fastening the panel to the underlying structure, may be biased outwardly so as to project outwardly and proximally, for example to engage a distally-facing surface on the support structure. The bias may arise through contact by the bars on the ring element with respective bars on the outside body. Similarly, the bias from the ring element may arise through positioning of the bolt or stud inside the ring element adjacent the ring element bars.

The ring structure and the outside body may be coaxial or concentric with each other. The concentric ring structure and body may be supported in the panel through mounting elements in the panel. The ring structure and the outside body may be supported in the panel by an insert and an insert cover.

In another example, methods and apparatus are described for supporting and/or retaining a fastener assembly, including any of those described herein, in a panel or other structure. In one configuration, a panel includes one or more structures for retaining and/or supporting a fastener assembly, for example within a cavity or counter bore formed in a surface of the panel. In one configuration, the panel includes a bore through which a portion of the fastener assembly can extend, and a counter bore for receiving the structure or structures for retaining and/or supporting the fastener assembly. In one configuration, the counter bore is formed in only one side of the panel, and in one example, the counter bore is formed into the side of the panel that is accessible for threading or otherwise securing a fastener into the fastener assembly. In another configuration, the structure or structures for retaining and/or supporting the fastener assembly may include mating components, and in one example a base structure is relatively fixed in a cavity of the panel and an outer structure for extending over part of the fastener assembly, such as to help support or retain the fastener assembly in the cavity. In a further configuration, the structure or structures for retaining and/or supporting the fastener assembly may include upper and lower components, the lower component being relatively secured in a cavity of the panel and the upper component adjacent to the lower component for helping to retain the fastener assembly with the lower component. In another configuration, the structure or structures for retaining and/or supporting the fastener assembly may be a cup element secured in a cavity of the panel, for example through adhesive or other securements, removably or fixed, and a mating cover joined to the cup element to retain and/or support a fastener assembly relative to the cup element. For example, the cover can help to retain a nut element relative to the panel. In any of the assemblies described herein for supporting and/or retaining a fastener assembly in a panel, having at least two components assembled to support and/or retain the fastener assembly, the components of the assembly for supporting and/or retaining the fastener assembly in the panel can be configured so that they do not rotate relative to each other any significant amount.

In another example, methods and apparatus are described for supporting and/or retaining a fastener assembly in a cavity of a panel through a first component for receiving a fastener receptacle in such a way that the fastener receptacle does not rotate within the first component an amount more than a full revolution. A second component joins the first component in such a way that the first and second components do not rotate appreciably relative to each other. In one configuration, the first component is secured, for example by adhesive, Velcro or otherwise, within the cavity of the panel. In another configuration, the first and second components are inter-engaging in such a way that they do not rotate relative to each other an appreciable amount. In a further configuration, the first and second components engage each other through complementary structures, one example of which is a sawtooth configuration. In any of the examples of one or more structures for retaining and/or supporting a fastener assembly, one or more seal elements can be provided between one of the structures and an adjacent surface of the panel. A seal may be used to inhibit contamination, such as by fluids and the like.

In structures for supporting and/or retaining a fastener assembly in a cavity of a panel, the methods and apparatus for supporting and/or retaining a fastener assembly can be incorporated into a panel to form a panel assembly. The panel assembly can thereafter be secured in place in its intended final location. The panel assembly can be pre-assembled or produced in another location and brought to or shipped to the location where the panel is ultimately to be installed. Maintenance and/or repair of the fastener assembly is made easier by easy removal and replacement of the structure that supports and/or retains the fastener assembly.

These and other examples are set forth more fully below in conjunction with drawings, a brief description of which follows.

BRIEF DESCRIPTION OF THE DRAWINGS

FIG. 4 is a side elevation view of a fastener assembly that can be used with the panels of FIGS. 1-3.

FIG. 5 is a longitudinal cross-section of the assembly of FIG. 4.

FIG. 6 is an exploded view of the fastener assembly of FIG. 4.

FIG. 7 is an upper isometric view of an insert cover for use with the assembly shown in FIGS. 1-3.

FIG. 8 is a side elevation view of the insert cover of FIG. 7.

FIG. 9 is a top plan view of the insert cover of FIG. 7.

FIG. 10 is a lower isometric view of the insert cover of FIG. 7.

FIG. 11 is an upper isometric view of an insert for use with the assembly shown in FIGS. 1-3.

FIG. 12 is a side elevation view of the insert of FIG. 11.

FIG. 13 is an top plan view of the insert of FIG. 11.

FIG. 14 is an upper isometric view of a ring element or nut for use in the fastener assembly of FIG. 4.

FIG. 15 is a lower isometric view of the nut of FIG. 14.

FIG. 16 is a bottom plan view of the nut of FIG. 14.

FIG. 17 is a side elevation view of the nut of FIG. 14.

FIG. 18 is a top plan view of the nut of FIG. 14.

FIG. 19 is an upper isometric view of an outer body or sleeve for use in the fastener assembly of FIG. 4.

FIG. 20 is a lower isometric view of the sleeve of FIG. 19.

FIG. 21 is a bottom plan view of the sleeve of FIG. 19.

FIG. 22 is a side elevation view of the sleeve of FIG. 19.

FIG. 23 is a top plan view of the sleeve of FIG. 19.

FIG. 24 is a side elevation view of the sleeve of FIG. 19.

FIG. 25 is a transverse and longitudinal cross-section of a panel and fastener assembly (with a male fastener removed for clarity) placed on an underlying structure such as an aircraft structure and ready to be secured.

FIG. 26 is a side elevation view of a fastener assembly and part of an opening finish (without a male fastener) for the assembly of FIG. 25.

FIG. 27 is a top plan view of the assembly of FIG. 26.

FIG. 28 is a side elevation view of a fastener for use in the assemblies of FIG. 25.

FIG. 30 is a bottom plan view of a fastener cup to form part of the opening finish of the panel assembly of FIG. 25.

FIG. 31 is a side elevation view of the cup of FIG. 30.

FIG. 32 is a top plan view of the cup of FIG. 30.

FIG. 33 is an upper isometric view of the cup of FIG. 30.

FIG. 34 is a lower isometric view of a sleeve for use with the fastener assembly of FIG. 25.

FIG. 35 is a top plan view of the sleeve of FIG. 34.

FIG. 36 is a side elevation view of the sleeve of FIG. 34.

FIG. 37 is a transverse and longitudinal cross-sectional view of the sleeve of FIG. 34 taken along the line 37-37 of FIG. 35.

FIG. 38 is an upper isometric view of the sleeve of FIG. 34.

FIG. 39 is a bottom plan view of the sleeve of FIG. 34.

FIG. 40 is an upper isometric view of a nut for use with the fastener assembly of FIG. 25.

FIG. 41 is an top plan view of the nut of FIG. 40.

FIG. 42 is a side elevation view of the nut of FIG. 40.

FIG. 43 is a transverse and longitudinal cross-sectional view of the nut of FIG. 40 taken along the line 43-43 of FIG. 41.

FIG. 44 is a lower isometric view of the nut of FIG. 40.

FIG. 45 is a bottom plan view of the nut of FIG. 40.

FIG. 46 is an upper isometric view of a panel portion and fastener assembly, such as may be part of the panel 100 in FIG. 1, placed on an underlying structure such as an aircraft structure and ready to be secured.

FIG. 47 is a side elevation view of the panel and fastener assembly on the support structure shown in FIG. 46.

FIG. 48 is a transverse cross-section of the assembly and support structure shown in FIG. 47 taken along line 48-48 of FIG. 47.

FIG. 49 is a lower isometric view of the assembly of FIG. 46.

FIG. 54 is a lower isometric view of a cover or outer element shown in FIG. 48 for retaining and/or supporting one or more elements of a fastener assembly such as that shown in FIG. 48.

FIG. 55 is a top plan view of the cover of FIG. 54.

FIG. 56 is a transverse cross-section of the cover of FIG. 55 taken along line 56-56 in FIG. 55.

FIG. 57 is a side elevation view of the cover of FIG. 54.

FIG. 59 is a side elevation view of a fastener support assembly shown in FIG. 58.

FIG. 60 is a partial transverse diametrical cross-section of the assembly shown in FIG. 59.

FIG. 61 is a detail view of a portion of the cross-section shown in FIG. 60.

FIG. 62 is a lower isometric view of a cover for use in the assembly shown in FIG. 58.

FIG. 63 is a bottom plan view of the cover of FIG. 62.

FIG. 64 is a side elevation view of the cover of FIG. 62.

FIG. 65 is a diametrical transverse cross-section of the cover of FIG. 62 taken along line 65-65 in FIG. 63.

FIG. 66 is an upper isometric view of a base insert in the assembly of FIG. 58.

FIG. 67 is a transverse cross-section of the base insert of FIG. 66 taken along line 67-67 of FIG. 69.

FIG. 68 is a side elevation view of the base insert of FIG. 66.

FIG. 69 is a top plan view of the base insert of FIG. 66.

FIG. 70 is an upper isometric view of a sleeve in the assembly of FIG. 58.

FIG. 71 is a bottom plan view of the sleeve of FIG. 70.

FIG. 72 is a side elevation view of the sleeve of FIG. 70.

FIG. 73 is a top plan view of the sleeve of FIG. 70.

FIG. 74 is an upper isometric view of a slotted sleeve of FIG. 58.

FIG. 75 is a lower isometric view of the slotted sleeve of FIG. 74.

FIG. 76 is a bottom plan view of the slotted sleeve of FIG. 74.

FIG. 77 is a side elevation view of the slotted sleeve of FIG. 74.

FIG. 78 is a partial longitudinal cross-section of the slotted sleeve of FIG. 74 taken along line 78-78 of FIG. 76.

FIG. 79 is a detail view of the cross-section of FIG. 78.

FIG. 80 is a partial longitudinal cross-section similar to the view of FIG. 78 of an alternative of a slotted sleeve.

FIG. 81 is a detail view of the cross-section of FIG. 80.

FIG. 82 is a lower isometric view of an alternative sleeve showing an alternative opening that can be implemented in any of the sleeve structures with openings herein.

FIG. 83 is an upper isometric of the sleeve of FIG. 82.

FIG. 84 is a side elevation view of the sleeve of FIG. 82.

DETAILED DESCRIPTION

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Various benefits will become more apparent with consideration of the description of the examples herein. However, it should be understood that not all of the benefits or features discussed with respect to a particular example must be incorporated into a fastener, component or method in order to achieve one or more benefits contemplated by these examples. Additionally, it should be understood that features of the examples can be incorporated into a fastener, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of fastener configurations and of methods of making and using the fastener are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

It should be understood that terminology used for orientation, such as front, rear, side, left and right, upper and lower, and the like, are used herein merely for ease of understanding and reference, and are not used as exclusive terms for the structures being described and illustrated.

Figure 1:
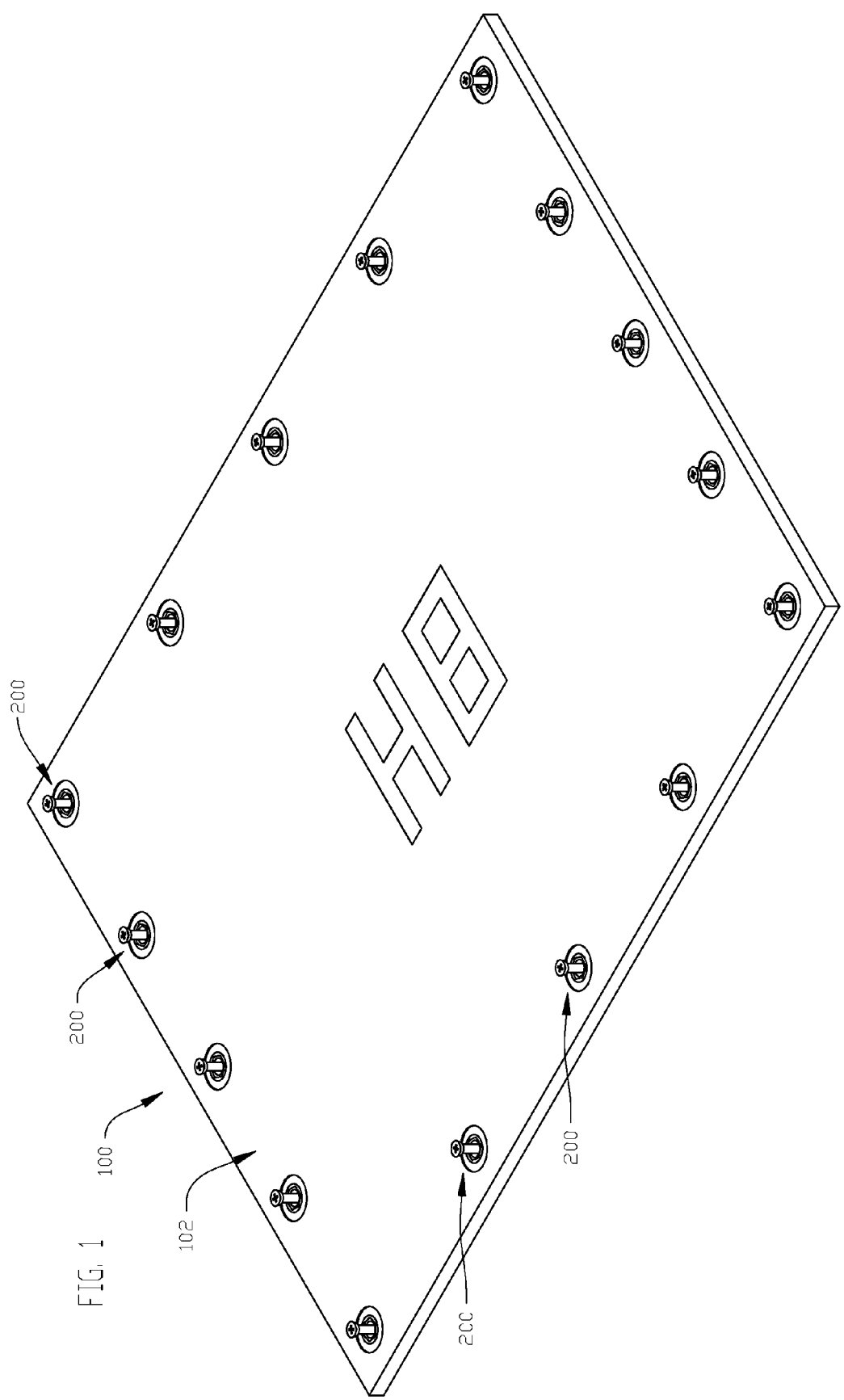
FIG. 1 is an upper isometric view of a panel and fastener assembly in accordance with one example described herein.

A panel assembly 100 (FIGS. 1-3) includes a panel 102 and one or more fastener assemblies 200. In the present example, the panel assembly has the fastener assemblies already incorporated into the panel 102. The panel assembly may then be ready to be installed, for example by aligning the fastener assemblies with corresponding openings in an underlying support structure and then securing the fasteners relative to the underlying support structure. The panel 102 may be configured in any number of ways, depending on the application, the method of assembly, and the like.

The underlying support structure 202 (FIGS. 2-3) maybe any conventional support structure, including a frame structure, bulkhead, or the like. Suitable openings 204 are formed in the support structure to receive portions of the fastener assemblies for securing the fastener assemblies relative to the support structure.

In the present example, the fastener assembly 200 includes a threaded bolt or stud 206, in the present example including a seal element such as an O-ring 208 adjacent to a flush head 210 of the bolt. In the present example, the bolt is threaded (not shown) along a suitable length of its shank 212 to provide the desired threaded engagement with the ring element or nut (described more fully below), as would be known to one skilled in the art.

Also in the present example, the fastener assembly 200 includes a ring element or nut 214. The ring element includes cantilevered or axially extending bars or rods 216 extending axially, and in the present example distally, from a cylindrical body 218 of the ring element 214. The cylindrical body in the present example is internally threaded 220 over a substantial axial distance of the cylindrical body, for example to receive the threads on the bolt 206.

The axially extending bars 216 include one or more outwardly extending projections 222 for engaging corresponding respective surfaces on the outer body or sleeve (described more fully below), into which all or a portion of the ring element 214 extends. The projections 222 may be tabs, cam surfaces, latches, or other outwardly extending elements. The projections 222, in the present example, bias corresponding portions of the outer body, and also limit relative rotation between the ring element 214 and the outer body. The projections are positioned approximately midway along the length of the bars 216 and have an approximately triangular shape in longitudinal cross-section. Other positions and shapes are possible. In the present example, the ring element has six bars, but other numbers of bars can be used. The bars have rounded end portions at their distal-most ends.

In the present example shown in the drawings, the outer surface of the ring element outside of the threads 220 has flats 223 or is formed as hex surfaces for engaging corresponding surfaces of the outer body. The outer surface of the ring element can also be circular, and engagement of the bars 216 with the outer body can limit rotational movement of the ring element relative to the outer body. In the present example, the bars 216 are flexible relative to the cylindrical portion 218, allowing the ring element to be relatively easily inserted into the outer body.

The ring element may be formed from a metal, including for example steel, stainless steel, spring steel or other metals with sufficient strength to withstand anticipated loading and stresses. It may also be formed from a high-strength plastic, or other suitable material, including those described in the patent references previously incorporated herein by reference, including Torlon, high-strength plastics, engineered plastics and other suitable materials. The ring element may be formed so that the bars 216 are biased inward, or so that they extend substantially axially, as shown in FIG. 5, for example.

Also in the present example, the fastener assembly 200 includes an outer body or sleeve 300. The sleeve 300 may be formed from a suitable plastic, such as those described in the patent references previously incorporated herein by reference, including Torlon, high-strength plastics, engineered plastics and other suitable materials. The sleeve may help to protect and reduce marring or scratching of surfaces when the panel assembly is being maneuvered or installed.

The sleeve 300 includes a proximal hex head 302 extending radially outward from a central axis of the sleeve. The head can alternatively have other flats than hexagonal, and may have other non-circular configurations.

Figure 2:
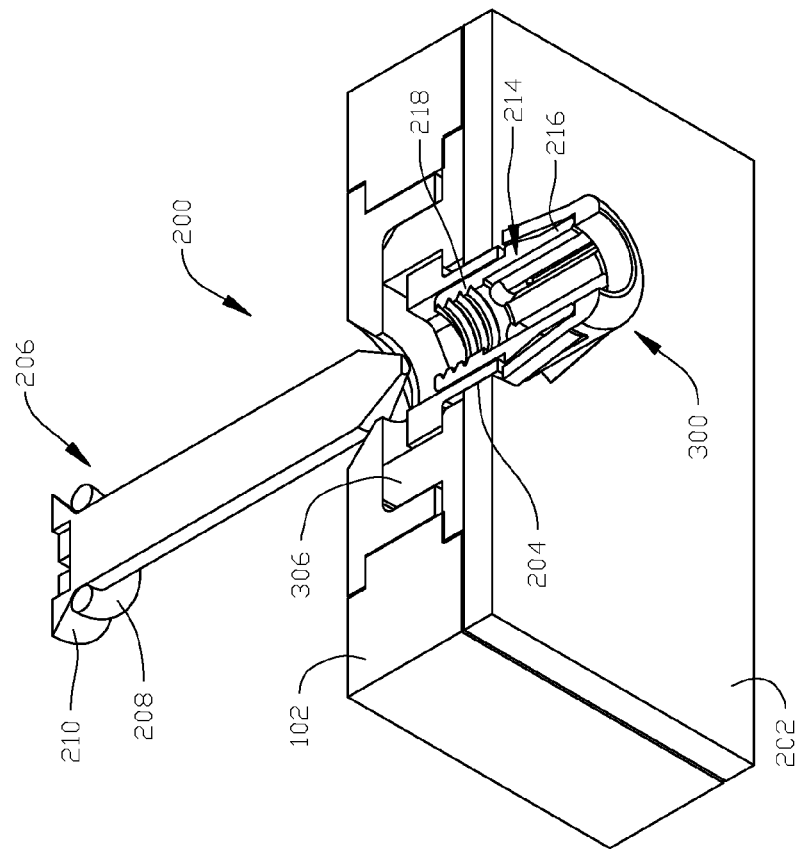
FIG. 2 is a lower isometric and transverse cross-section view of a fastener assembly and panel mounted to a support structure.
Figure 3:
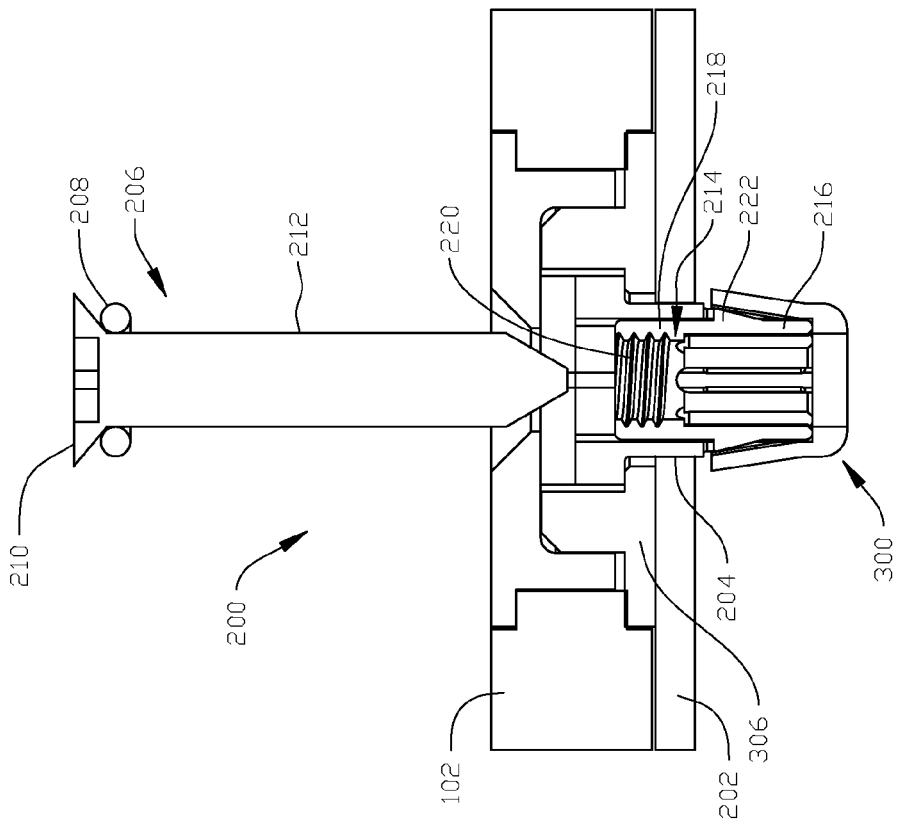
FIG. 3 is a front elevation view of the assembly of FIG. 2.

The head 302 extends over a corresponding shoulder 304 (FIGS. 11 and 13) of a panel insert 306 (FIGS. 2-3 and 11-13). The insert 306 includes an outer rim 308 that engages an underside surface of a counterbore formed in the panel 102, for example as shown in FIGS. 2-3. The hex head 302 of the sleeve 300 engages corresponding hex surfaces 310 in the insert 306. The sleeve 300 is captured in the insert 306 and therefore the panel 102 by an insert cover 312 (FIGS. 2-3 and 7-10). The insert and the insert cover may be secured in place in a bore formed in the panel 102 by suitable means, such as adhesive, a friction fit, or other means.

The sleeve includes an internal channel 314 extending completely through the sleeve 300. The proximal portion or upper portion of the internal channel includes hex surfaces 316 for engaging the corresponding hex surfaces on the ring element 214, if desired. In another example, the hex surfaces 316 can be omitted, for example where limiting of relative rotation between the ring element and the sleeve is achieved through engagement of the bars 216 and corresponding surfaces in the sleeve 300.

The sleeve 300 includes a cylindrical body portion 316 extending from the hex head 302 to a distal end portion 318. The distal end portion may be rounded so as to help protect against marring or scratching of adjacent components.

The sleeve 300 includes a plurality of cantilever structures 320 formed in corresponding openings 321 in the side of the cylindrical body portion 316. The cantilever structures 320 are supported by the cylindrical wall at distal portions of the openings, where they are allowed to flex, for example under the influence of bias provided by the bars 216 on the ring element. In the present example, there is a cantilever structure in the sleeve 300 to correspond with each of the bars 216 in the ring element. The projections on each of the bars extend into corresponding ones of the openings in the sleeve 300, and they are generally straight and axially aligned with the sleeve 300 when relaxed and before being flexed by the bars on the ring element 216. The cantilever structures 320 secure the fastener assembly against the distal-facing side of the support structure 202 (FIGS. 2-3). The proximal-facing surfaces of the cantilever structures 320 are formed so as to be preferably flat in a plane transverse to the central axis of the sleeve 300, as can be seen in FIGS. 22 and 24.

In another example of a fastener assembly, as well as a panel assembly incorporating a fastener assembly, a panel assembly 400 (FIG. 25) is shown mounted on an underlying support structure 402, for example an aircraft structure, over a cover panel or cover material 404. The structure and configuration of the support structure 402 and cover material 404 are well known to those skilled in the art upon consideration of the discussion herein, and include respective holes for receiving parts of the fastener assembly. While it should be understood that the fastener 206 would be typically threaded into the fastener assembly as described above with respect to FIGS. 1-6, the fastener 206 is omitted from the assembly drawings FIGS. 25-27 and 29 for purposes of clarity. However, in one example, the fastener 206 will be threaded at least part way into the corresponding threaded slotted sleeve before the panel assembly is placed against the underlying structure, and in another example, the fastener 206 will be threaded sufficiently into the corresponding sleeve to extend the legs on the nut so as to underlie the distal-facing surface of the underlying structure in the position shown in FIG. 25.

The panel 102 in the panel assembly 400 includes an opening 406 formed through the panel. In the present example, the opening 406 is formed as a substantially circular bore having a distal counterbore for receiving and positioning a cup 410 similar in outward configuration to the cup 306 (FIGS. 11-13). The opening 406 also includes a proximal counterbore 412 (FIG. 25) for receiving a cover 414, substantially identical to the cover 312 described above with respect to FIGS. 7-10. In the present example, the opening and the counterbores are substantially circular in cross-section, but they can have other configurations. As with the cup and the cover described previously, the cup 410 and the cover 414 form an opening finish secured such as through adhesive in the panel 102 for receiving the fastener assembly. As with the fastener assemblies 200, the panel assembly 400 can have the fastener assemblies already incorporated into the panel 102 before the panel assembly 400 is placed against the underlying structure. The panel assembly may then be ready to be installed, for example by aligning the fastener assemblies with corresponding openings in the underlying support structure and then securing the fasteners relative to the underlying support structure.

In the present example, the cup 410 includes a substantially circular rim 416 (FIGS. 30-33) configured for fitting into and being secured in the distal opening 408. A bottom surface 418 extends inward from the outer surface of the rim 416 to a circular opening 420 for receiving and allowing the fastener assembly to pass beyond the bottom surface of the cup. The opening 420 is formed by a bore 422 through the cup 410.

The cup includes an upper rim surface 424, part of which will bear against the distal counterbore 408 in the panel 102. A boss 426 extends upward from the upper surface 424 from a circular portion interior to the outer surface of the rim 416. The boss 426 extends upward to engage and be covered by the cover 414. The boss terminates at an upper surface 428. The boss also includes an opening 430 extending substantially from the upper surface 428 to the upper rim surface 424. The opening 430 is formed to include at least one sidewall that has a noncircular surface. In the present example, the opening 430 includes four non-circular surfaces forming a square, substantially axially-extending wall 432. The wall 432 serves the same function as the walls of the hexagonal walls 316 described above with respect to FIGS. 19-24. In the present example, the surfaces of the wall 432 are flats that help to limit pivoting of parts of the fastener assembly. Other noncircular configurations can be used in the cup to help to limit pivoting of parts of the fastener assembly.

Also in the present example, a fastener assembly includes a protector element, a nut element and a mating or corresponding fastener element, though the mating fastener element is not shown in the fastener assembly as illustrated. Additionally, in a pre-assembled panel assembly, any of the fastener assemblies described herein can be used. In the present example, the protector element of the fastener assembly includes an outer body or sleeve 500 (FIGS. 25-27 and 29 and 34-39) having a substantially cylindrical body portion 502. The body portion extends axially from a proximal end portion 504 to a distal end portion 506. The proximal end portion 504 includes a shoulder or rim 508 extending laterally from a proximal portion of the cylindrical body portion 502 to non-circular side surfaces 510. In the present example, the rim 508 includes four non-circular side surfaces 510, at least one of which during installation of the fastener assembly and threading of the fastener stud will contact the side surfaces 432 in the cup 410. The contact will help to limit pivoting of the nut element in the cup, and therefore relative to the panel assembly. The four non-circular side surfaces form a substantially square rim extending outward of the cylindrical body portion 502. However, it should be understood that other configurations can be formed on the body portion 502, for example to limit pivoting of the sleeve 500, to limit axial movement of the sleeve 500 in the cup or for other reasons. Additionally, the rim 508 can have a circular profile if the rim is not to be used to help to limit pivoting of the fastener assembly. Furthermore, the rim can be entirely omitted or sized sufficiently small to fit through the opening 422 in the cup, and other structures can be used for axially positioning the sleeve in the panel assembly.

The substantially cylindrical body portion 502 of the sleeve 500 terminates at a distal-most end surface 512. The end surface 512 extends substantially normal to a central longitudinal axis of the sleeve 500, making it substantially flat. The cylindrical body portion 502 includes an outer surface 514 that extends substantially axially from the rim 508 to a transition surface 516, transitioning between the side surface of the cylindrical body portion and the end surface 512. The transition surface 516 is curved along a substantially continuous radius, which helps to minimize the existence of sharp edges about the end portion 506 of the sleeve.

The distal end portion 506 of the sleeve body 502 includes a bore 518 extending the axial length of the sleeve 500. In the present example, the bore has a substantially circular cross-section and is sized to permit passage of the fastener stud beyond the distal-most end surface 512.

The cylindrical body portion 502 and its outer surface 514 extend substantially axially from the rim 508 to the distal end portion 506, and is substantially smooth, except for one or more openings formed in the body. In the present example, the sleeve includes a plurality of openings 520 formed to extend laterally outward from the bore 518 through the cylindrical wall of the body portion 502. In the present example, four openings are formed in the sidewall, but other numbers of openings can be formed as desired. The openings are substantially square in profile, with rounded corners, and have opening walls extending along respective chords of the cylinder. In other configurations, the opening walls can extend radially or in other directions, as desired. The openings are positioned relatively closer to the distal end portion 506 than to the rim 508, and each is positioned substantially equidistant from their respective adjacent openings.

The sleeve includes a substantially cylindrical counterbore 522 formed by a wall 524. The wall 524 extends from a radiused transition wall 526 (FIGS. 37-39) to a bottom wall 528, which extends radially inward to the bore 518. The counterbore 522 is substantially circular, continuous and smooth except for the openings 520 and sidewalls described more fully below, though such sidewalls can be omitted if desired.

The sleeve 500 also includes one or more internal sidewalls 530. In the present example, four sidewalls are included in the counterbore 522 extending inward from the wall 524. However, other numbers of sidewalls can be included, but there typically would be the same number of sidewalls as there are legs on the nut element to help guide the legs of the nut element axially within the sleeve 500. Where sidewalls are included, a single sidewall can be used to help guide the nut element, in which case the sidewall can be spaced substantially equidistant from adjacent openings 520, or two sidewalls can be used, in which case an opening would be centered between the sidewalls.

Figure 29:
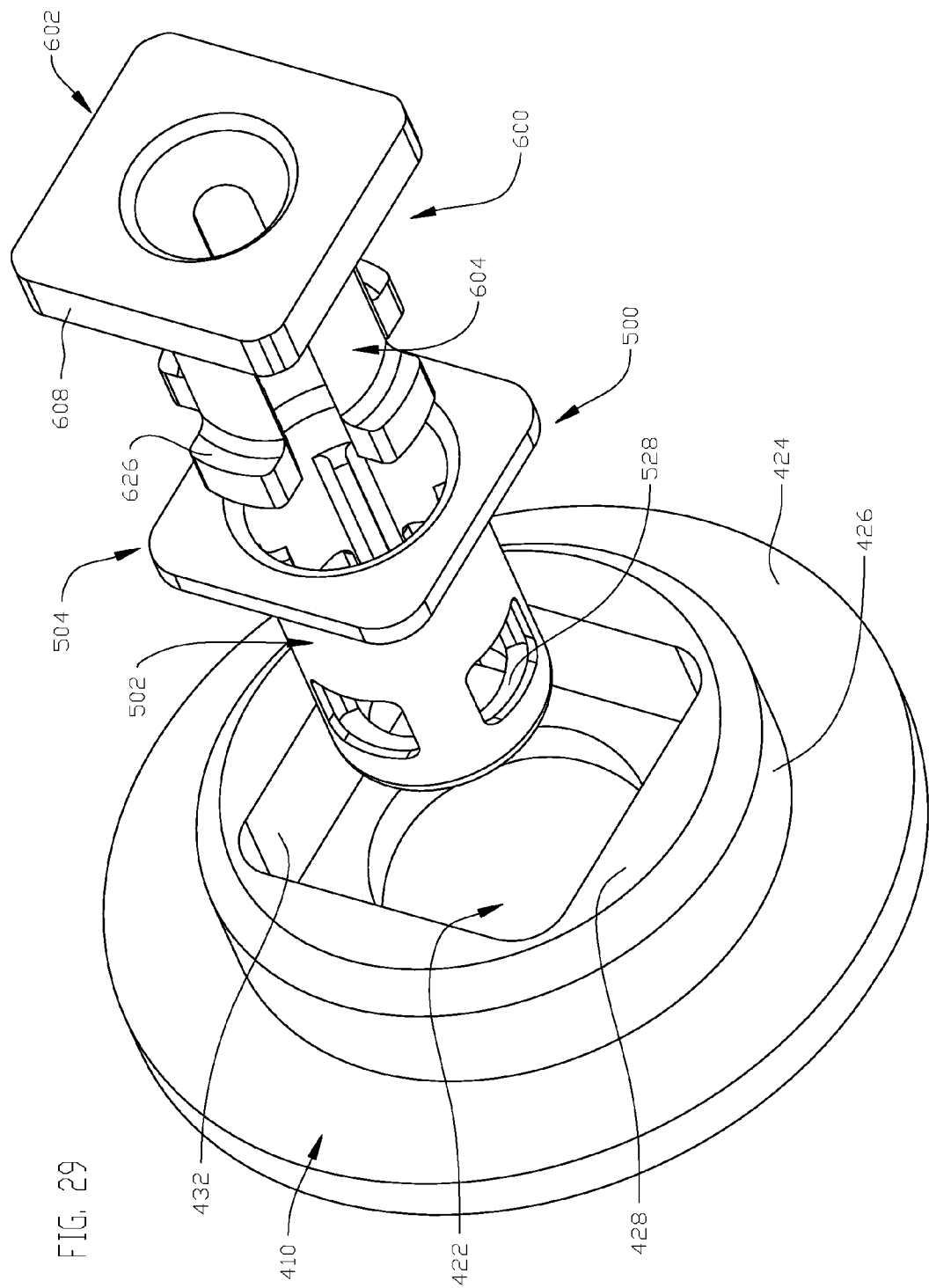
FIG. 29 is an upper isometric exploded view of the assembly of FIG. 26.
Figure 52:
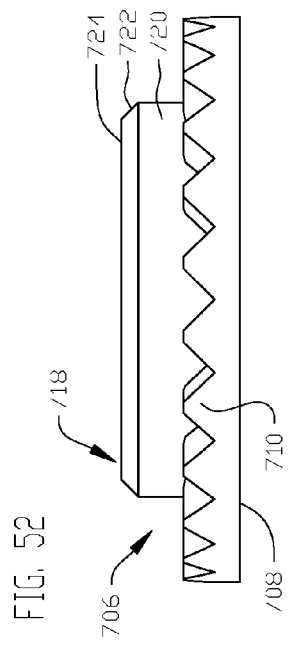
FIG. 52 is a side elevation view of the cup of FIG. 50.
Figure 53:
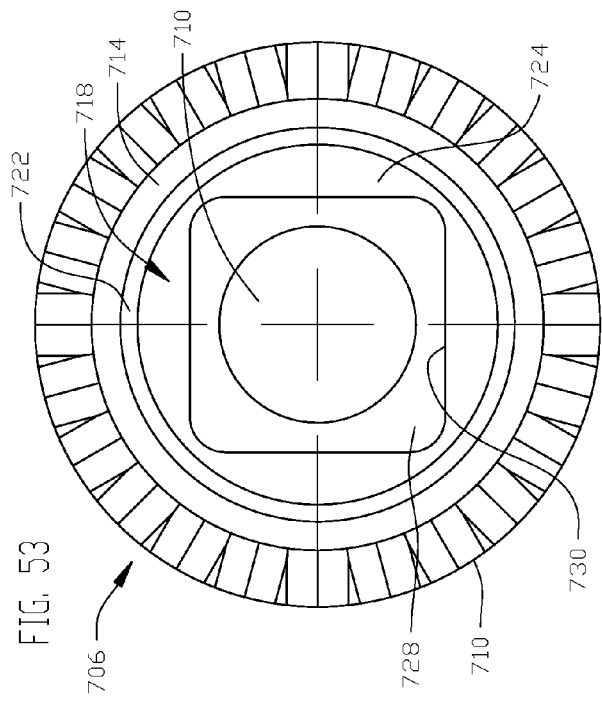
FIG. 53 is a top plan view of the cup of FIG. 50.
Figure 50:
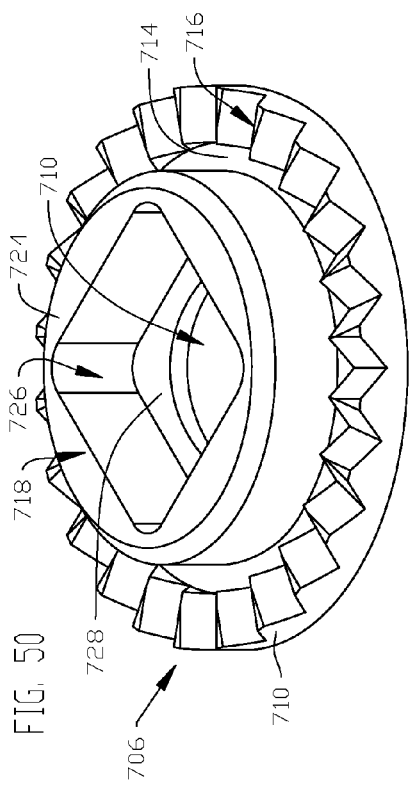
FIG. 50 is an upper isometric view of a base element or cup shown in FIG. 48 for supporting a fastener assembly.
Figure 51:
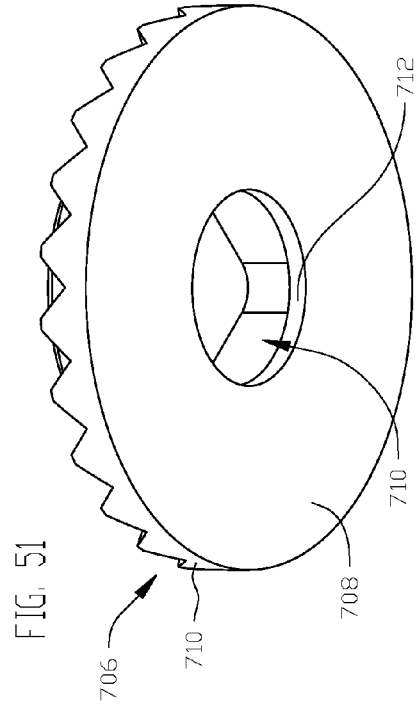
FIG. 51 is a lower isometric view of the cup shown in FIG. 50.

In the present example, each sidewall includes respective side surfaces, for example 532 and 534 (FIG. 39), and they extend along respective chords in the sleeve. Each sidewall extends inward approximately to the outer diameter of the bore 518. Adjacent side surfaces extend substantially perpendicular to each other, as shown in FIG. 39, or they may be each partially concave as shown in FIG. 29. Alternatively, the profiles of the openings 520 and the sidewalls 530 can be selected to conform to portions of the nut element that will be guided by the sidewalls and that will extend through the openings 520.

The sleeve helps to reduce marring or scratching of surfaces it may contact during assembly, installation or transportation, or installation on the final support structure, such as in an aircraft. The sleeve 500 can be formed from the same materials as the sleeve 300 described herein.

The fastener assembly in the panel assembly 400 of the present example also includes a female-threaded portion or threaded receptacle in the form of a slotted sleeve 600. In the present example shown in FIGS. 25-27, 29 and 40-45, the slotted sleeve 600 includes a proximal rim portion 602 extending laterally outward from a longitudinally extending body portion 604.

A proximal rim portion 602 has a substantially flat top surface 606 terminating at an outer perimeter at substantially longitudinally extending sidewalls 608. In the present example, adjacent sidewalls meet at rounded corners. The sidewalls form non-circular surfaces, in the present examples flats, that are sized to fit into the cup opening 422 and engage adjacent walls of the cup. The sidewalls form a square configuration, but other configurations can be used. In other examples, the sidewalls can be circular, or they can be omitted or sized sufficiently to allow them to extend into the counterbore 522 of the sleeve 500. In such a configuration, and if relative pivoting is to be limited between the slotted sleeve 600 and the sleeve 500, other surfaces can be used to limit pivoting. For example, laterally extending surfaces on the legs of the slotted sleeve engaged in the openings 520 of the sleeve 500 can limit rotation between the two components.

The body of the slotted sleeve 600 includes a substantially cylindrical portion 610 extending distally or axially from the proximal rim portion 602. The cylindrical portion 610 extends substantially circularly around the body 604. The cylindrical portion 610 supports a plurality of leg portions 612 extending distally or axially from the cylindrical portion 610, and they are joined to adjacent leg portions through a relatively constant radius surface at the cylindrical portion 610. The leg portions can also be formed so as to converge or diverge from the cylindrical body portion 610 when in the free or relaxed state, if desired. The leg portions 612 extend to the end of the body 604 to respective distal-most end surfaces 614. In the present example, four leg portions are formed in the slotted sleeve 600, but other numbers of leg portions can be used. In the present example, there are the same number of leg portions as openings 520 in the sleeve 500. The legs are flexible relative to the rest of the slotted sleeve, and allow the slotted sleeve to be easily inserted into the sleeve 500.

Each of the leg portions 612 includes laterally outwardly-extending projections 616. The projections can also be formed as tabs, cam surfaces, latches or other outwardly extending elements. The projections in the present example extend laterally from the ends of the respective legs. However, they can be positioned elsewhere axially along the legs. Each of the projections include rounded, distal outside edge surfaces 618. The rounded edge surfaces help to position and allow relatively easy movement of the slotted sleeve 600 relative to the sleeve 500. Each of the projections include relatively flat side surfaces 620 terminating at rounded axial side transition surfaces 622, and the side transition surfaces 622 terminate at the outer side surfaces 624. The rounded surfaces 622 also help to position and allow relatively easy movement of the slotted sleeve 600 relative to the sleeve 500.

Each projection also includes a relatively flat top, proximal facing surface 626, joining the respective leg along a radius and joining the outer side surface 624 at approximately a 90° angle. The proximal-facing surfaces 626 extend out the respective openings 520 in the sleeve 500 and under corresponding adjacent portions of the distal-facing surface of the support structure 402 (FIG. 25). The projections have an approximately rectangular cross-section, both longitudinally and transversely, while other shapes are possible.

A bore 630 extends axially of the slotted sleeve 600 from the top surface 606 to the distal-most end surfaces 614. A relatively small countersink surface 632 is formed between the top surface 606 and the bore 630. A second countersink surface is formed at 634, with the bore 630 having a substantially smooth and right-cylindrical sidewall there between. In the present example, the countersink surfaces and the bore there between take up substantially the height of the rim portion 602. The second countersink 634 also extends along the bore into the cylindrical body portion 610. The remainder of the bore from the second countersink surface 634 to the distal-most end surfaces 614 is formed with threads for receiving complementary threads 636 on the fastener stud 206, allowing the stud to move along the threads. The arrangement of the threads on the respective leg portions is such as to allow threading of the fastener stud 206.

The slotted sleeve as part of the fastener assembly helps to secure the adjacent portion of the panel assembly to the underlying structure, such as structure 402 (FIG. 25). The slotted sleeve may be formed from the same materials as the ring element described herein, including steel, stainless steel and spring steel, as well as other materials.

On assembly, the slotted sleeve 600 generally has the leg portions converging relative to each other, and the ends of the legs are inserted longitudinally into the outer sleeve 500. Each of the legs is guided between respective adjacent sidewalls 530 to approach respective openings 520 in the outer sleeve. The sleeve assembly, with or without the fastener stud 206 is then placed in a cup 410 for a corresponding finished hole in the panel assembly 400 with the flats of the sleeve assembly resting in the square opening of the cup 410. The cap or cover 414 is also installed in the opening, either before or after the cup and sleeve assembly are placed in the opening. One or both of the cup and cover are fixed in place, for example with adhesive.

During assembly of the sleeves in the present examples, the slotted sleeve 600 does not extend beyond the distal-most surface of the outer sleeve 500. Additionally, the fastener stud 206 also does not extend beyond the distal-most surface of the outer sleeve. As a result, any movement, positioning or other actions that might bring the panel assembly into contact with other surfaces, including the underlying support structure, is less likely to produce damage, such as scratching or marring of adjacent surfaces. For example, plastic outer sleeves help to reduce such damage. Once the panel assembly 400 is ready to be secured to the underlying structure 402 (FIG. 25), the fastener stud can be threaded past the end surface of the outer sleeve 500.

A panel assembly can be produced with a number of finished openings and corresponding fastener assemblies in place. Such a pre-assembled panel assembly can then be placed at the desired location on the support structure, and the fastener assemblies advanced into corresponding openings in the support structure. The fastener studs can then be advanced so that the outer projections on the legs of the slotted sleeve 600 can be pushed out of the corresponding openings 520 in the outer sleeve 500 and under the adjacent distal-facing surfaces of the underlying structure 402. Further advance of the fastener stud draws the slotted sleeve 600 against the underside of the support structure 402 to secure that portion of the panel assembly in place.

It is noted that a panel assembly can be preassembled, as described herein, to form a pre-assembled panel assembly. The preassembled panel can have all of the hardware necessary for securing the panel to the underlying structure, and is therefore ready to be installed, for example with any necessary tools. Such pre-assembly can reduce the amount of hardware used for assembly and installation, especially at the final assembly site, such as on an aircraft. Such preassembly can also help to reduce the amount of foreign object damage that might occur, for example due to loss of components, and the like.

With such preassemblies, the preassembled panels or other structures may be moved or shipped to a final assembly location. For example, the preassembled panels can be packaged and stored until shipment, or shipped and stored at the final assembly site ready to be installed. Transport or shipping of the preassembled panels or other structures to a final destination structure, such as an aircraft structure can be by one or more of automobile, truck, ship, plane, train, tractor, trailer, conveyor, or other forms common for delivery of parts for installation on a structure, for example an aircraft structure. For aircraft applications, such preassembled panels can be formed from panel structures specifically configured for the final installation, and the fastener assemblies can be preinstalled and ready for securing the panel assembly onto the final structure. In the described examples, the preassembled structure is positioned adjacent the location where it will be installed, for example on the aircraft, and the protective elements on the fastener assembly reduce the possibility of damage to surrounding surfaces. Once the panel assembly is mounted to or positioned on the underlying support structure, the threaded fasteners can be advanced into the opening in the support structure to secure the panel assembly in place.

In another example of a supporting and/or retaining structure that can be used with any of the fastener assemblies or methods described herein, a fastener support structure 700 (FIGS. 46-49) is placed in or assembled into a panel 102A. In the present example, the panel 102A is formed with a bore 702 and a counter bore 704. The bore 702 receives, in the conventional way, part of a fastener assembly, such as fastener assembly 600 described above, or any other suitable fastener assembly. The counter bore 704 is formed in one side of the panel 102A, preferably concentric or coaxial with the bore 702. In the present example, the counterbore is formed on the side at which the fastener will be accessed. Ultimately, the panel 102A, the fastener support structure 700 and fastener assembly 600 or other combination is placed against the support structure 402 and cover material 404, such as in the manner previously described. The fastener assembly, and the other fasteners in the panel assembly, are then secured to the support structure, as would be known to one skilled in the art.

In the present examples, the fastener support structure 700 is formed from a two-part assembly. The two-part assembly includes a base 706, which may be an insert or cup (FIGS. 48 and 50-53). The base 706 in the present example includes a relatively flat bottom surface 708, and the base 706 is secured such as by adhesive between the bottom surface 708 and the bottom of the counter bore 704. The type and quantity of adhesive used to secure the base in the counter bore may be selected so as to permanently secure the base in the cavity of the panel, or it may be selected to allow the base to be removable, without damaging the panel. Other securement means may be used, such as interference fit, Velcro fastening material, or other fastening elements. The bottom surface of the base may be roughened or have other surface configurations as desired, for example as a function of the application of the panel.

The base 706 has a circular perimeter wall 710 in the present configuration. The base also includes a circular central opening 710 formed by a circular wall 712 in the center of the base, for receiving part of the fastener assembly.

The circular perimeter wall 710 extends radially inward to an annular groove 714. The wall 710 has an upper or axially-facing surface 716. In the present example, the upper surface 716 is other than planar, and in the present example forms a sawtooth arrangement. The non-planar upper surface in the present example engages an at least partly complementary surface in a cover, described more fully below with respect to FIGS. 54-57, so that the base and cover do not rotate appreciably relative to each other. The surfaces also help to make them self-aligning. In the present example, the upper surface sawtooth configuration includes adjacent angled flats extending substantially radially and they form associated peaks and valleys, where each of the peaks and valleys are formed to have a slight radius.

The radial extent of each of the peaks and valleys is determined by the outer perimeter surface 710 and the annular groove 714. The annular groove provides a space between the wall 710 and a boss 718. The boss 718 includes an outer cylindrical wall 720 extending upward from the annular groove 714 to a chamfered rim 722. The boss terminates at an upper surface 724, in the present example forming the uppermost extent of the base 706. In the present example, the outer surface 720 is substantially right-circular cylindrical and the upper surface 724 is substantially flat, but these surfaces can take other configurations, as desired.

The boss 718 includes a cavity 726, which may have the same structure and function as the cavities described herein for the cups and inserts previously described. In the present example, the cavity 726 extends from the upper surface 724 of the boss to a bottom surface 728 (FIGS. 50 and 53), leaving a relatively thin base wall formed by the bottom surface 708. The cavity has four sidewalls 730 forming a substantially square cavity extending from the upper surface 724 to the cavity bottom surface 728. The cavity receives a portion of the fastener assembly and helps to limit pivoting of the fastener assembly relative to the panel, such as in the manner previously described herein. As used in this document, "limit pivoting" or "limiting pivoting" is defined as that function that limits pivoting of the fastener assembly portion (such as the base 706 or the comparable structures in the other examples herein) sufficiently as to allow tightening or seating of a threaded male fastener element securely in the panel. Some pivoting of the fastener assembly portion can be permitted, such as less than a full 360 degree circle, for example less than 10-30 degrees, while still restricting pivoting until such time as the male threaded fastener can be fully seated and secured. Where the fastener assembly portion is substantially fixed relative to the panel, such as by adhesive, little if any pivoting will occur.

The two-part assembly forming in the present example a fastener support structure also includes a cover 740 (FIGS. 46, 48 and 54-57). The cover generally includes surfaces complementary to corresponding surfaces on the base 706. The complementary surfaces allow the cover to fit in engagement with corresponding surfaces on the base 706. Additionally, the cover helps to provide a finish to the counter bore in the panel, support part of the fastener assembly and retain part of the fastener assembly in the panel.

The cover 740 includes an outer or upper surface 742 extending from an outer perimeter wall 744 inward to a countersink 746. The upper surface 742 is substantially flat in the present example, and is accessible along with the adjacent surface of the panel. The countersink 746 is formed in the upper surface and concentric about a central axis of the cover for receiving a conforming head of a fastener. Other opening configurations are also possible.

The underside of the cover opposite the upper surface includes a counter bore 748 extending radially outward along a base surface 750 to a circular interior sidewall 752. The base surface 750 and the circular sidewall 752 form a cavity for receiving the boss 718 of the base 706, complementary to each other in the present example. As shown in FIG. 48, the base and the cover fit together relatively closely between the boss and the cavity in the cover.

In the present example, the outer perimeter wall 744 includes a perimeter groove 754. The groove receives a seal element, such as an O-ring 756 (FIG. 48) or other element for sealing between the assembly and a wall in the adjacent panel. The seal element helps to limit fluids and other contaminants from getting to the fastener assembly or under the panel. The outer diameter is such that the outer perimeter wall 744 otherwise fits fairly close in the opening of the panel.

The outer perimeter wall 744 and the circular sidewall 752 terminate in a bottom surface 756, facing axially away from the outer surface 742. In the present example, the bottom surface includes surface elements complementary to the corresponding adjacent surface elements on the base 706. In the present example, the bottom surface includes sawtooth surfaces substantially opposite but otherwise identical to the sawtooth arrangement on the upper surface 716 of the base 706, except that the radial extent of the bottom surface in the cover 740 is greater than the radial extent of the bottom surface in the base. However, they need not be. The complementary sawtooth configuration allows the cover and the base to be relatively self-aligning. Other configurations may be used to allow self alignment helping to make easier the assembly of the components. The complementary sawtooth configuration limits the ability of the cover to pivot relative to the base, for example during securing of the fastener. Adhesive or other securement of the base in the panel limits rotation of the assembly relative to the panel.

The two-part support structure of the base and the cover form an interface between the fastener assembly and the panel. The support structure can be formed by other combinations of elements as well.

The fastener support structure 700 and the associated panel and fastener assembly can be used and applied in ways similar to those described herein.

In another example of a supporting and/or retaining structure that can be used with any of the fastener assemblies or methods described herein, a fastener support structure 800 (FIGS. 58-79) is placed in or assembled into a panel 102B. As illustrated in the present example, the panel is formed with a bore 802 into which is formed or secured a plug or other insert 804, for example at the time the panel 102B is formed. The plug 804 is formed or otherwise configured to include a bore 806 and a counter bore 808 into which the fastener support structure 800 is placed. Other fastener support structures described herein can be placed in such plugs as well. The bore and counter bore are substantially circular and coaxial, but it should be understood that other opening configurations can be used, if desired, in which case the fastener support structures would generally conform to the cavity defined by the opening configurations or otherwise be complementary to the cavity.

Figure 58:
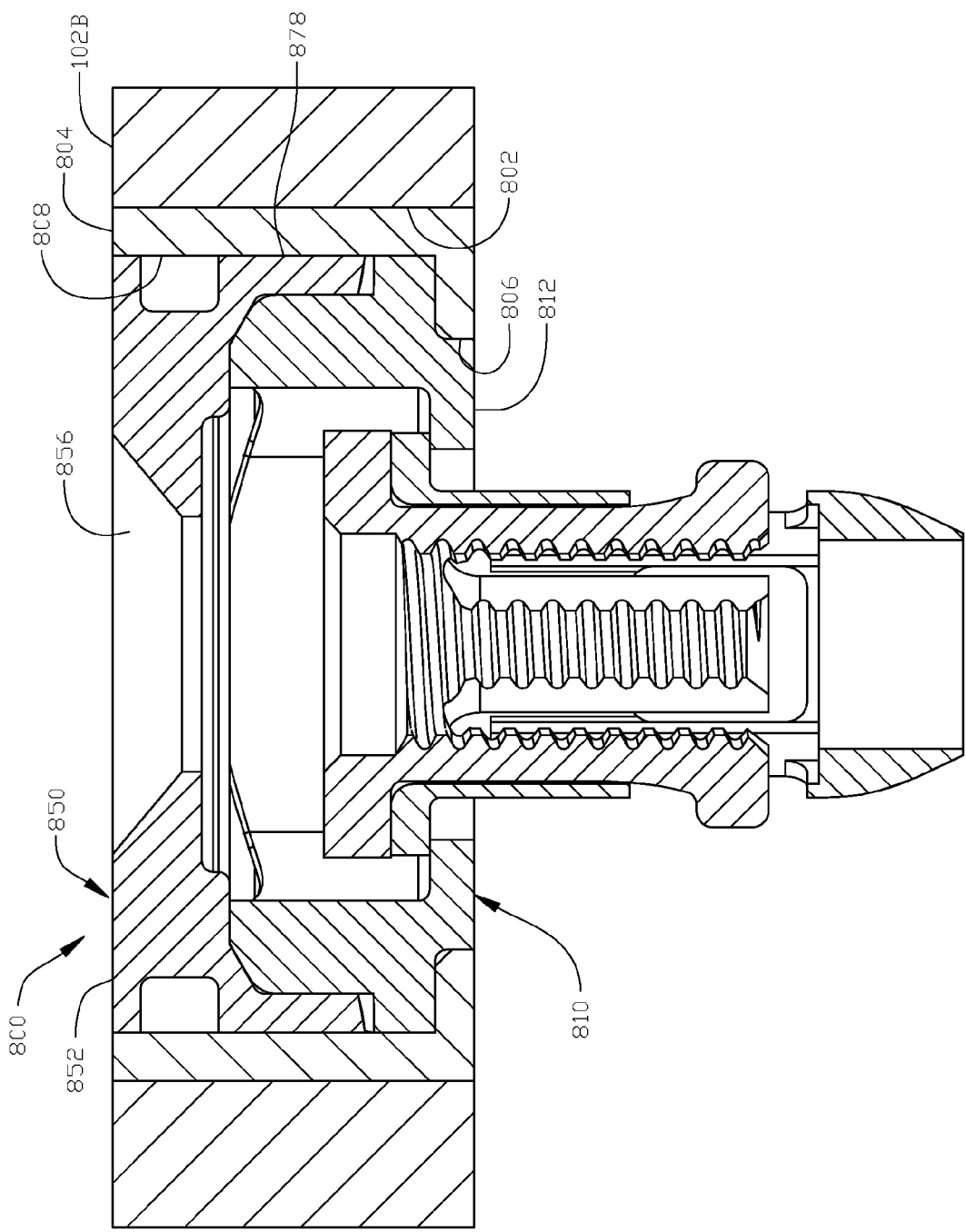
FIG. 58 is a transverse cross-section of an assembly and support structure according to another example described herein.

The counter bore 808 will be accessible for installing the fastener support structure from the upper side of the panel 1028, as viewed in FIG. 58. Ultimately, the panel 1028, the fastener support structure and a fastener assembly, such as those described herein, or other combination are placed against the support structure 402 and cover material 404, such as in the manner previously described. The fastener assembly, and the other fasteners in the panel assembly, are then secured to the support structure, as would be known to one skilled in the art.

In the present examples, the fastener support structure 800 is formed from a two-part assembly. The two-part assembly includes a base 810, which may be a bottom insert, cup or other structure for being supported by the plug 804. The base 810 is shown in more detail in FIGS. 59-61 and 66-69. The base 810 includes a lower-most surface 812, shown as extending substantially flush with the lower exposed surface of the plug 804. The base 810 includes a substantially circular perimeter surface 814 extending axially from the bottom surface 812 to a main body portion 816 having a lower radial-extending surface 818 terminating at an outer surface 820. In the present example of a circular fastener support, the outer surface 820 is substantially circular. Other outer configurations can be used, for example to conform to the inner surface of the cavity in the plug 804.

In another example of a supporting and/or retaining structure that can be used with any of the fastener assemblies or methods described herein, a fastener support structure analogous to that described above as 800 in FIGS. 58-79 is in part formed in the panel and in part inserted into the panel 102B. In this example (not illustrated), the panel is formed with a bore such as bore 802 into which is formed surfaces that would include non-circular surfaces for helping to limit pivoting of a fastener element such as any of the slotted sleeves or threaded receptacles described herein. The non-circular surfaces would receive and limit pivoting of the sleeve and slotted sleeve, such as elements 214 and 300, 500 and 600, and 900 and 1000. The non-circular surfaces could be formed such as by molding, boring or cutting appropriate surfaces in the plug or other insert 804, for example at the time the panel 102B is formed. The plug is formed or otherwise configured to include a bore and a counter bore as discussed herein, into which the fastener assembly will be placed. With the plug such as plug 804 formed to limit pivoting of a fastener element, the lower or first insert or base of a fastener support structure can be omitted, and the upper insert or cover (such as 850 described herein) then captures the fastener assembly in the panel.

In the present example described with respect to FIGS. 58 et seq., the lower or first insert or base of a fastener support structure is included in the assembly. The base 810 is secured such as by adhesive placed between the lower surface 818 and the axially-facing surface of the plug 804. The type and quantity of adhesive used to secure the base in the plug may be selected so as to permanently secure the base in the cavity of the panel, or it may be selected to allow the base to be removable, without damaging the plug or the panel. Other securement means may be used as described herein.

The base 810 includes a central opening 822. In the present example, the opening is sized to receive the fastener assembly, such as any of those described herein, and also to provide radial float for the fastener. The central opening 822 is formed in the base structure including the lower-most surface 812. The base 810 includes at least one wall between the central opening 822 and the outer perimeter 816, and in the present example, includes a first wall 824 and a second wall 826. The first wall 824 forms an outer wall for the base 810 having as its outer surface the outer perimeter surface 820. In the present example, the first wall 824 is substantially cylindrical and substantially conforms to the profile of the interior cavity of the plug 804. In the present example, the cross-sectional profile of the first wall 824 is substantially circular.

Also in the present example, the second wall 826 forms an inner wall for the base 810 defining a boss and has a plurality of inner walls 828. In the illustrated example, at least one of the inner walls 828 is substantially non-circular, and conforms to a geometry of a portion of the fastener assembly, for example the outer perimeter of the slotted sleeve. The spacing of the inner walls 828 from each other has been selected for this example to provide radial float for the fastener assembly. Additional features of the first and second walls are described below.

The outer wall 824 terminates at an upper surface 830. The upper surface faces axially away from the bottom surface 812. In the illustrated example, the upper surface 830 is other than planar, and is spaced axially from the lower surface 818 (FIGS. 59-60) a varying distance, varying as a function of position on the perimeter of the base. The spacing of the upper surface 830 varies in the illustrated example according to a sine wave, a relatively continuous variation as a function of circular or perimeter position. Other upper surface configurations can be used instead, for example those described with respect to the base 706 described above. In the present example, the angle of the tangent to the relatively straight surface portion 832 (FIG. 66) relative to horizontal is approximately 45°. In other examples, the angle of the tangent can be higher, for example up to 85 or almost 90°, or the angle may be in the range of 60-75°. The upper surface, in conjunction with a complementary surface on a cover or top insert (described more fully below) helps to make the cover self aligning and relatively fixed in the panel against substantial pivoting about the central axis of the assembly. In the present example, the upper surface 830 extends radially inward from the perimeter surface 820 to a perimeter surface 834 of the inner wall 826. The thickness of the upper surface 830 is substantially constant around the perimeter of the base 810.

The perimeter surface 834 of the inner wall 826 is substantially circular.

The perimeter surface extends upward to a transition, in the present example including a radiused, upwardly and inwardly curving surface 836, extending upward and radially inward from the perimeter surface to a bevel surface 838. The radius of the curving surface 836 is relatively greater than the radius of the oppositely facing curving surface on the cover, described more fully below. The bevel surface 838 extends at an angle from the horizontal of approximately 29.91°.

The bevel surface 838 extends radially inwardly and upwardly at appropriate locations to a substantially flat, horizontal surface 840, as represented in the drawings. In the present example, the base 810 includes four flat surfaces 840. The number of flat surfaces may generally be a function of the number of walls 828. The surface area of the flat surfaces 840, or the transverse extent thereof, is a function of the outside dimension of the second wall 826, the curvature of the radius portion 836 and the angle of the bevel 838, as well as the spacing between the walls 828. The flat surfaces 840 help to support the top insert or cover of the assembly, for example against axial loading from the fastener.

At any given point on the perimeter, the radius surface 836 extends upwardly and inwardly until it reaches either the bevel surface 838 or one of the internal walls 828 in the cavity of the base. Likewise, the bevel surface 838 extends upwardly and inwardly until it reaches either the upper surface 840 or one of the internal walls 828, depending on the perimeter location. Similarly, the perimeter extent of the radius surface 836, the bevel surface 838 and the upper surface 840 is a function of the thickness of the second wall 826, which in turn is determined by the size of the cavity defined by the walls 828. The cavity may have the same structure and function as the cavities described herein for the cups and inserts previously described. In the present example, the cavity is substantially square and receives a portion of the fastener assembly and helps to limit pivoting of the fastener assembly relative to the panel, such as in the manner previously described herein.

The two-part assembly forming in the present example a fastener support structure also includes a cover or top insert 850 (FIGS. 58-65). The cover generally includes surfaces complementary to corresponding surfaces on the base 810. The complementary surfaces allow the cover to fit in engagement with corresponding surfaces on the base. Additionally, the cover helps to provide a finish to the counter bore in the plug/panel, support part of the fastener assembly and retain part of the fastener assembly in the panel.

The cover 850 includes an outer or upper surface 852 extending from an outer perimeter wall 854 inward to a countersink surface 856. The upper surface 852 is substantially flat in the present example, and is accessible along with the adjacent surface of the panel. The countersink 856 is formed in the upper surface and concentric about a central axis of the cover for receiving a conforming head of a fastener. Other opening configurations are also possible.

The countersink surface terminates at a bore 858 providing an opening through the cover. The bore 858 opens into a counter bore 860 (FIGS. 60, 62, 63 and 65). The counter bore 860 provides clearance for the head of the slotted sleeve as the slotted sleeve is drawn upward, but leaves material outward of the outer perimeter wall 862 of the counter bore 860. The outer perimeter wall 862 extends axially away from the bore 858 to a relatively planar, or flat, bearing surface 864. The bearing surface 864 bears against the opposite-facing upper surfaces 840 in the base 810 for supporting the load applied by the fastener.

The bearing surface 864 extends radially outward from the counter bore 860 to a second bevel surface 866 almost entirely complementary to be oppositely-facing bevel surface 838 on the base 810. The second bevel surface 866 extends at an angle from horizontal of approximately 30.00°, or at least an angle greater than that for the bevel surface 838 on the base 810. The different bevel angles help to reduce the amount of non-axial contact, in other words non-axial loading, between the base 810 and the cover, and reduce side loading on the components arising from fastening the assembly. In one example, the side loading is less than 50% of the axial loading, and in another example substantially less, for example less than 25% and even less than 10%. In the configuration described where the angle difference between the adjacent bevel surfaces is greater than about 0.01 degree, the side loading can be less than 25% of the axial loading. In one example, the angle is at least one degree.

The second bevel surface 866 extends outward and downward to a second radius surface 868 adjacent the first radius surface 836. The radius of curvature for the second radius surface 868 is slightly less than that for the first radius surface, or is otherwise different so that the two adjacent surfaces of the base 810 and the cover 850 do not have appreciable contact, or even no contact. In the present example, there is no contact over the bevel surfaces or the radiused surfaces because of the radii of curvature and the angles of bevels 838 and 866.

The underside of the cover 850 opposite the upper surface 852 includes a cavity 870 defined by the counter bore 860, the bearing surface 864, the second bevel surface 866 and an outer wall 872 extending axially away from the opening 858. The cavity receives the boss of the base 810 such that the upper surfaces 840 on the base 810 support the cover 850. As shown in FIGS. 58-61, the base and cover fit together relatively closely. However, the bevel surfaces 838 and 866 are configured and dimensioned so that there is little if any contact between them. Additionally, the radius surface 836 and the radius surface 868 (FIGS. 61) are configured so that they have little if any contact with each other. These configurations help to limit side loading arising from tightening of the fastener in the assembly.

The outer wall 872 has a thickness approximately the same as the thickness of the outer wall 824 of the base 810. The outer wall 872 includes an inner surface 874 extending axially to a substantially axially-facing surface 876. The surface 876 is substantially complementary to corresponding surface 832 on the base 810, but extends at a slight angle outwardly and downwardly from the inside surface 874 to the outside surface 878. The slight angle helps to make easier the proper joining and self-alignment of the cover and the base. The complementary configuration limits the ability of the cover to pivot relative to the base, for example during securing of the fastener. Adhesive or other securement of the base in the panel limits rotation of the assembly relative to the panel. Generally, the configuration of the axially-facing surface 876 and the surface 832 will be complementary to each other, and therefore the surface 876 will not be discussed further.

The outside surface 878 extends substantially axially along the outside of the cover 850 to form an outer cylindrical surface except for a perimeter groove 880. The groove receives a seal element, such as an O-ring such as 756 (FIG. 48) or other element for sealing between the assembly and the wall of the plug 804. The seal has the same structure and function as those described herein. Otherwise, the outer dimensions such as the outer perimeter wall diameter fits fairly close in the cavity of the plug 804.

The two-part support structure of the base and the cover form an interface between the fastener assembly and the panel. The support structure can be formed from other combinations of elements as well. The fastener support structure 800 and the associated panel and fastener assembly can be used and applied in ways similar to those described herein.

Also in the present example, a fastener assembly includes a protector element, a slotted sleeve element and a mating or corresponding fastener element, though the mating fastener element is not shown in the fastener assembly as illustrated in FIG. 58. Additionally, in a pre-assembled panel assembly, any of the fastener assemblies described herein can be used. In the present example, the protector element of the fastener assembly includes an outer body or sleeve 900 (FIGS. 70-73) having a substantially cylindrical body portion 902. The body portion extends axially from a proximal end portion 904 to a distal end portion 906. The proximal end portion 904 includes a shoulder or rim 908 extending laterally from a proximal portion of the cylindrical body portion 902 to non-circular side surfaces 910. In the present example, the rim 908 includes four non-circular side surfaces 910, at least one of which during installation of the fastener assembly and threading of the fastener stud will contact the side surfaces 828 in the base 810. The contact helps to limit pivoting of the slotted sleeve element in the base, and therefore relative to the panel assembly. Four non-circular side surfaces form a substantially square rim extending outward of the cylindrical body portion 902. However, it should be understood that other configurations can be formed on the body portion 902, for example to limit pivoting of the sleeve 900, to limit axial movement of the sleeve 900 in the base or for other reasons. Additionally, the rim 900 can have a circular profile if the rim is not to be used to help to limit pivoting of the fastener assembly. Furthermore, the rim can be entirely omitted or sized sufficiently small to fit through the opening 822 in the base, and other structures can be used for axially positioning the sleeve in the panel assembly.

The substantially cylindrical body portion 902 of the sleeve 900 terminates at a distal-most end surface 912. The end surface 912 extends substantially normal to a central longitudinal axis of the sleeve 900, making it substantially flat. The cylindrical body portion 902 includes an outer surface 914 extending substantially axially from the rim 908 to a transition surface 916, transitioning between the side surface of the cylindrical body portion and the end surface 912. The transition surface 916 is curved along a first radius of curvature followed by a curve along a second radius of curvature at a distal-most transition surface 916B. The first radius of curvature is less than a second radius of curvature, the combination of which provides a more gradual transition to the end surface 912 than in the other examples described herein.

The distal end portion 906 of the sleeve body 902 includes a bore 918 extending the axial length of the sleeve 900. In the present example, the bore has a substantially circular cross-section and is sized to permit passage of the fastener stud beyond the distal-most end surface 912 if desired.

The cylindrical body portion 902 and its outer surface 914 extends substantially axially from the rim 908 to the distal end portion 906, and is substantially smooth, except for one or more openings formed in the body. In the present example, the sleeve includes a plurality of openings 920 formed to extend laterally outward from the bore 918 through the cylindrical wall of the body portion 902. In the present example, four openings are formed in the side wall, but other numbers of openings can be formed as desired, generally conforming to the number of legs on the slotted sleeve element. The number of legs can be one, two, three, four or more, in part determined by the size of the fastener assembly, but in the present example there are the same number of openings as there are legs. In the present example, the openings are substantially square in profile, with rounded corners, and have opening walls extending along respective chords of the cylinder. In other configurations, the opening walls can extend radially or in other directions, as desired. The openings are positioned relatively closer to the distal end portion 906 than to the rim 908, and each is positioned substantially equidistant from their respective adjacent openings.

The sleeve includes a substantially cylindrical counter bore 922 formed by a wall 924, substantially similar to those 522 and 524 described above with respect to FIGS. 37-39. The wall 924 extends from a radiused transition wall 926 to a bottom wall 928, which extends radially inward to the bore 918. The counter bore 922 is substantially circular, continuous and smooth except for the openings 920 and sidewalls described more fully below, though such side walls can be omitted if desired.

The sleeve 900 also includes one or more internal sidewalls 930. In the present example, four side walls are included in the counter bore 922 extending inward from the wall 924. However, other numbers of side walls can be included, but there typically would be the same number of sidewalls as there are legs on the slotted sleeve element to help guide the legs of the slotted sleeve element axially within the sleeve 900. Where sidewalls are included, a single sidewall can be used to help guide the slotted sleeve element, in which case the side wall can be spaced substantially equidistant from adjacent openings 920, or two sidewalls can be used, in which case an opening would be centered between the sidewalls.

In the present example, each side wall includes respective side surfaces, for example 932 and 934 (FIG. 73), and they extend along respective chords in the sleeve. Each sidewall extends inward approximately to the outer diameter of the bore 918. Adjacent side surfaces extend substantially perpendicular to each other, as shown in FIG. 73, or they may be each partially concave such as those shown in FIG. 29. Alternatively, the profiles of the openings 920 and the sidewalls 930 can be selected to conform to portions of the slotted sleeve element that will be guided by the sidewalls and that will extend through the openings 920.

The sleeve helps to reduce marring or scratching of surfaces it may contact during assembly, installation or transportation, or installation on the final support structure such as in an aircraft. The sleeve 900 can be formed from the same materials as the sleeve 300 described herein.

The fastener assembly in the panel assembly of the present example (FIG. 58) also includes a female-threaded portion or threaded receptacle in the form of a slotted sleeve 1000. In the present example shown in FIGS. 58 and 74-79, the slotted sleeve 1000 includes a proximal rim portion 1002 extending laterally outward from a longitudinally extending body portion 1004. The proximal rim portion 1002 has a substantially flat top surface 1006 terminating at an outer perimeter at substantially longitudinally extending sidewalls 1008. In the present example, adjacent sidewalls meet at rounded corners. The sidewalls form non-circular surfaces, in the present examples flats, that are sized to fit into the base opening formed by the walls 828 and engage walls 828 of the base. The sidewalls form a square configuration, but other configurations can be used. In other examples, the sidewalls can be circular, or they can be omitted or sized sufficiently to allow them to extend into the counterbore 922 of the sleeve 900. In such a configuration, and if relative pivoting is to be limited between the slotted sleeve 1000 and the sleeve 900, other surfaces can be used to limit pivoting. For example, laterally extending surfaces on the legs of the slotted sleeve engaged in the openings 920 of the sleeve 900 can limit rotation between the two components.

The body of the slotted sleeve 1000 (FIGS. 74-79) includes a substantially cylindrical portion 1010 extending distally or axially from the proximal rim portion 1002. The cylindrical portion 1010 extends substantially circularly around the body 1004. The cylindrical portion 1010 supports a plurality of leg portions 1012 extending distally or axially from the cylindrical portion 1010, and they are joined to adjacent leg portions through a relatively constant radius surface at the cylindrical portion 1010. The leg portions can also be formed so as to converge or diverge from the cylindrical body portion 1010 when in the free or relaxed state, if desired. The leg portions 1012 extend to the end of the body 1004 to respective distal-most end surfaces 1014. The lengths of the leg portions may be selected to allow a desired axial float in the assembly. In the present example, four leg portions are formed in the slotted sleeve 1000, but other numbers of leg portions can be used, including three leg portions, spaced equidistant from each other. In the present example, there are the same number of leg portions as openings 920 in the sleeve 900. The legs are flexible relative to the rest of the slotted sleeve, and allow the slotted sleeve to be easily inserted into the sleeve 900.

Each of the leg portions 1012 includes laterally outwardly-extending projections 1016. The projections can also be formed as tabs, cam surfaces, latches or other outwardly extending elements. The projections in the present example extend laterally from the ends of the respective legs. However, they can be positioned elsewhere axially along the legs. Each of the projections include rounded, distal outside edge surfaces 1018. The rounded edge surfaces help to position and allow relatively easy movement of the slotted sleeve 1000 relative to the sleeve 900. Each of the projections include relatively flat side surfaces 1020 terminating at rounded axial side transition surfaces 1022, and the side transition surfaces 1022 terminate at the outer side surfaces 1024. The rounded surfaces 1022 also help to position and allow relatively easy movement of the slotted sleeve 1000 relative to the sleeve 900.

Each projection also includes a rounded proximal transition surface 1025 extending proximally and inwardly to a relatively flat top, proximal facing surface 1026, joining the respective leg along a first radius 1026A and a second radius 1026B and joining the outer side surface 1024 at a relatively long, gradual transition at a varying angle 1027 from a vertical (line 1027B).

The proximal-facing surfaces 1026 extend out the respective openings 920 in the sleeve 900 and under corresponding adjacent portions of the distal-facing surface of the support structure, such as 402 (FIG. 25). The projections have an approximately rectangular cross-section, both longitudinally and transversely, while other shapes are possible.

A bore 1030 extends axially of the slotted sleeve 1000 from the top surface 1006 to the distal-most end surfaces 1014. A relatively small countersink surface 1032 is formed between the top surface 1006 and the bore 1030, and the bore 1030 has a substantially smooth and right-cylindrical sidewall distal of the countersink 1032. In the present example, the countersink surface and the bore take up substantially the height of the rim portion 1002. The remainder of the bore to the distal-most end surfaces 1014 is formed with threads for receiving complementary threads on the fastener stud 206, allowing the stud to move along the threads. The arrangement of the threads on the respective leg portions is such as to allow threading of the fastener stud 206.

In an alternative configuration of any of the female-threaded portions or threaded receptacles (214, 600, 1000), one or more of the leg portions may include angled or slanted end surfaces (FIGS. 80-81). By way of illustration in the context of an alternative to the slotted sleeve 1000, identical reference numerals for which represent and correspond to identical structures, it should be understood that the modifications to the structure of the slotted sleeve 1000 can be made in a similar manner to the other threaded receptacles 214 and 600. In the present illustration, a slotted sleeve 1000A includes leg portions 1012A on the longitudinally extending body portion 1004A. However, instead of a substantially flat or transverse end surface 1014, the slotted sleeve includes an angled or slanted end surface 1014A. The angled end surface allows a longer leg portion for strength with a reduced added mass that would ordinarily accompany a longer leg portion. The angle that the end surface 1014A makes to a longitudinal axis (for example an axis of the slotted sleeve, parallel to the axis 1027B in FIG. 79) is less than 90° but 45° or greater. In an alternative configuration, the end surface 1014A may follow an arcuate transition. In one example, the gradient of the surface can be lower adjacent the threads and higher as the surface approaches the outward-facing surface of the projection.

The slotted sleeve as part of the fastener assembly helps to secure the adjacent portion of the panel assembly to the underlying structure, such as structure 102B (FIG. 58). The slotted sleeve may be formed from the same materials as the ring element described herein, including steel, stainless steel and spring steel, as well as other materials.

The fastener support structure 800 and the associated panel and fastener assembly can be used and applied in ways similar to those described herein. Additionally, components of the assemblies could possible be interchanged, with appropriate modifications, as would be apparent to one skilled in the art taking into account the descriptions and examples herein.

In alternative configurations for any of the cylindrical elements or sleeves described herein (300, 500, and 900), the openings can be open-ended openings such as openings in 920A (FIGS. 82-84). In these examples, the openings can be configured as described previously but the distal-part of the structure defining the opening is removed. For example, by way of illustration in the context of an alternative to the sleeve 900, a sleeve 900A is formed so that the opening can extend to the distal end portion of the sleeve 900A. In this example, each opening is defined by a less than completely closed wall 930A. Other configurations for the openings can be used instead of or in addition to the openings described herein. The remaining elements for the sleeves would otherwise be substantially the same as or identical to those in the example of the sleeve 900A shown in FIGS. 82-84. The sleeve is dimensioned lengthwise so that the ends of the sleeve extend beyond the corresponding distal end of the nut element.

In a similar manner, the openings in the side of the cylindrical body portion 316 can also open out at the end of the sleeve 300, and the cantilever structures 320 can be supported from a side or an end portion of the cylindrical body 316. The cantilever structures 320 are then flexed outwardly by the projections 222.

Similarly, in the example of the sleeve 500, the openings 520 can open out at an end of the sleeve 500. The protrusions 616 on the leg portions 612 extend through the openings 520 proximal of the free ends of sleeve 500. In one example, the distal-most end surfaces 614 on the slotted sleeve 600 terminates significantly before the end surfaces of the adjacent walls of the opening. Therefore, the sleeve 500 extends beyond the end surfaces on slotted sleeve 600.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A fastener assembly comprising a sleeve with a sleeve wall extending longitudinally and having a channel within the sleeve wall, wherein the sleeve wall has proximal and distal end portions, wherein the sleeve wall includes a wall defining an opening through the sleeve wall, a fastener receptacle element having proximal and distal end portions and wherein the fastener receptacle element is at least partly within the sleeve and with at least one internally, at least partially-threaded wall configured to receive a threaded fastener element, wherein at least one of the sleeve and the fastener receptacle element includes a flange portion at the proximal end portion extending radially outward relative to a central axis of the fastener assembly, and wherein the fastener receptacle element includes at least one flexible leg element extending from a proximal portion to a free distal end portion and configured such that during assembly the free end portion is inserted in a distal direction at the sleeve proximal portion longitudinally into the sleeve until part of the free end portion extends within the sleeve opening so that the fastener receptacle element is axially movable within the sleeve, wherein the free distal end portion of the flexible leg element is positioned on the fastener receptacle element opposite the flange portion, and wherein the sleeve includes a distal portion extending beyond the at least one flexible leg element.

2. The assembly of claim 1 wherein the wall defining the opening through the sleeve wall has a closed perimeter.

3. The assembly of claim 1 wherein the at least one internally threaded wall is formed on an inside surface of the at least one flexible leg element and the threads extend the entire length of the at least one flexible leg.

4. The assembly of claim 1 wherein the sleeve includes a surface complimentary to an externally adjacent surface.

5. The assembly of claim 1 wherein the at least one flexible leg on the fastener receptacle element extends along a longitudinal axis and includes a thickness that increases in a longitudinal direction and wherein the thickness increases in a direction only outward and away from threads on the at least one flexible leg.

6. The assembly of claim 1 wherein the at least one flexible leg includes a first portion having threads and wherein the first portion and the threads form a substantially constant thickness, and the at least one flexible leg includes a second portion having threads wherein the second portion and the threads form a thickness that increases in the longitudinal direction.

7. The assembly of claim 1 wherein the sleeve includes a head and the fastener receptacle element proximal end includes a shoulder extending laterally, the shoulder contacting the sleeve head.

8. A fastener assembly comprising a sleeve with a sleeve wall extending longitudinally and having a channel within the sleeve wall and wherein the sleeve wall includes a wall defining an opening through the sleeve wall, a fastener receptacle element at least partly within the sleeve and with at least one internally, at least partially-threaded wall configured to receive a threaded fastener element, and wherein the fastener receptacle element includes at least one flexible leg element extending from a proximal portion to a free distal end portion and configured such that during assembly the free end portion is inserted in a distal direction longitudinally into the sleeve until part of the free end portion extends within the sleeve opening so that the fastener receptacle element is axially movable within the sleeve, and wherein the sleeve includes a distal portion extending beyond the at least one flexible leg element, wherein the sleeve includes a surface complimentary to an externally adjacent surface and wherein the adjacent surface is an insert adapted to be placed in the panel portion and substantially fixed relative to the panel portion.

9. The assembly of claim 8 wherein the insert is a first insert and further including a second insert contacting the first insert and wherein the first and second inserts include rotation-limiting portions configured to limit relative rotation between the first and second inserts.

10. The assembly of claim 9 wherein at least one of the first and second inserts includes a sealing element.

11. A method of assembling a panel structure for installation onto an aircraft structure for supporting the panel, the method comprising assembling into the panel before moving the panel structure into final position on an aircraft at least first and second fastener assemblies each having a nut element, a sleeve element extending adjacent a respective nut element and beyond the respective nut element and the panel, and male threaded fastener elements threaded into respective nut elements.

12. The method of claim 11 further including securing a first insert having an insert opening in an opening formed in the panel, and placing a second insert against the first insert, such that placing the second insert against the first insert limits relative rotation between the first and second inserts.

13. The method of claim 12 wherein placing the second insert secures the nut element to the panel structure.

14. The method of claim 11 further including inserting a sleeve element into an opening through the panel.

15. The method of claim 11 wherein the nut element extends into a sleeve element having an opening and wherein the nut element includes a projection that extends into the opening and contacts directly or indirectly a surface of the aircraft structure and wherein the opening in the sleeve element is an enclosed-wall opening and the projection on the nut element extends into the opening to contact directly or indirectly the surface of the aircraft structure.

16. The method of claim 11 further including moving the panel containing the first and second fastener assemblies into position on the aircraft structure and thereafter threading the male threaded fasteners into respective nut elements so that the nut elements secure a portion of the panel to the aircraft structure.

\* \* \* \* \*